US012804771B2

(12) United States Patent
Kawasaki et al.

(10) Patent No.: US 12,804,771 B2
(45) Date of Patent: Nov. 17, 2026

(54) USER EQUIPMENT (UE)

(71) Applicant: SHARP KABUSHIKI KAISHA, Sakai City (JP)

(72) Inventors: Yudai Kawasaki, Sakai City (JP); Masafumi Aramoto, Sakai City (JP); Shuichiro Chiba, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 516 days.

(21) Appl. No.: 18/286,022

(22) PCT Filed: Mar. 29, 2022

(86) PCT No.: PCT/JP2022/015412
§ 371 (c)(1),
(2) Date: Oct. 6, 2023

(87) PCT Pub. No.: WO2022/215593
PCT Pub. Date: Oct. 13, 2022

(65) Prior Publication Data

US 2024/0188183 A1 Jun. 6, 2024

(30) Foreign Application Priority Data

Apr. 9, 2021 (JP) ................................ 2021-066222

(51) Int. Cl.
*H04W 76/38* (2018.01)
*H04W 8/12* (2009.01)

(52) U.S. Cl.
CPC ............ *H04W 76/38* (2018.02); *H04W 8/12* (2013.01)

(58) Field of Classification Search
CPC ..... H04W 60/04; H04W 48/02; H04W 84/04; H04W 8/08; H04W 52/02; H04W 76/28; H04W 48/06; H04W 60/001; H04W 12/06; H04W 48/18
See application file for complete search history.

(56) References Cited

U.S. PATENT DOCUMENTS

| | | | | |
|---|---|---|---|---|
| 2022/0264283 | A1* | 8/2022 | Won | H04W 8/205 |
| 2022/0386401 | A1* | 12/2022 | Qiao | H04W 28/0215 |
| 2024/0305971 | A1* | 9/2024 | Hashmi | H04W 76/19 |

OTHER PUBLICATIONS

3GPP TS 24.501 V17.2.0 (Mar. 2021) 3rd Generation Partnership Project; Technical Specification Group Core Network and Terminals; Non-Access-Stratum (NAS) protocol for 5G System (5GS); Stage 3; (Release 17).

(Continued)

*Primary Examiner* — Iqbal Zaidi
(74) *Attorney, Agent, or Firm* — ScienBiziP, P.C.

(57) ABSTRACT

In a 5GS, provided is a communication unit for implementing a function related to Enhancement for the 5G Control Plane Steering of Roaming for UE in CONNECTED mode (eCPSOR_CON). In the 5GS, provided is a method and a communication unit for a procedure for a network to notify a UE of information used for control for the network to control timing at which the UE transitions from a connected mode to an idle mode for SOR. Furthermore, provided is a method for controlling the timing at which the UE transitions from the connected mode to the idle mode.

3 Claims, 6 Drawing Sheets

(56) References Cited

OTHER PUBLICATIONS

3GPP TS 23.122 V17.2.0 (Mar. 2021) 3rd Generation Partnership Project; Technical Specification Group Core Network and Terminals; Non-Access-Stratum (NAS) functions related to Mobile Station (MS) in idle mode (Release 17).

Sharp et al., UE behavior upon updating "user controlled list of services exempted from release due to SOR", C1-212452, 3GPP TSG-CT WG1 Meeting #129-e Electronic meeting, Apr. 19-23, 2021.

* cited by examiner

USER EQUIPMENT (UE)

TECHNICAL FIELD

The present invention relates to a User Equipment (UE).

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE).

The 3GPP has recently studied next-generation communication technologies and system architectures for a 5th Generation (5G) mobile communication system which is a next generation mobile communication system, and in particular, has standardized a 5G System (5GS) as a system for realizing a 5G mobile communication system (see NPL 1). In the 5GS, technical problems attributable to connection of various terminals to a cellular network are extracted to standardize solutions.

CITATION LIST

Non Patent Literature

NPL 1: 3GPP TS 24.501 V17.2.0 (2021-3); 3rd Generation Partnership Project; Technical Specification Group Core Network and Terminals; Non-Access-Stratum (NAS) protocol for 5G System (5GS); Stage 3 (Release 17)

NPL 2: 3GPP TS 23.122 V17.2.0 (2021-3); 3rd Generation Partnership Project; Technical Specification Group Core Network and Terminals; Non-Access-Stratum (NAS) functions related to Mobile Station (MS) in idle mode; (Release 17)

SUMMARY OF INVENTION

Technical Problem

For the 5G System (5GS), in order to provide various services, a 5G Core Network (5GCN), which is a new core network, is under study.

In addition, for the 5G, a network slice has been defined that corresponds to a logical network providing specific network functions and specific network characteristics for a specific service type or a specific group. For example, the network slice may be a logical network provided for terminals with a low delay function, or may be a logical network provided for sensor terminals used in the Internet of Things (IoT).

In 5G, Control plane Steering of Roaming (CP-SOR) in which Steering of Roaming (SOR) is implemented on a Control plane has been introduced. SOR is a method and/or a technique by which a roaming UE is promoted to roam a network as a prioritized roaming destination (or recommended roaming destination) indicated by an HPLMN.

In 3GPP, Enhanced CP-SOR has been further under study. Enhanced CP-SOR is a technique in which, in CP-SOR, a NW configures a timing at which a UE transitions from a connected mode to an idle mode. Here, Enhanced CP-SOR may be referred to as eCPSOR_CON (Enhancement for the 5G Control Plane Steering of Roaming for UE in CONNECTED mode). However, a realization method for satisfying the above-described demand is not clear.

The present invention is made in the light of the circumstances as described above, and provides a method of implementing a function for eCPSOR_CON in the 5GS.

Solution to Problem

A User Equipment (UE; a terminal apparatus) according to an embodiment of the present invention includes a transmission and/or reception unit; and a controller. The transmission and/or reception unit receives Steering of roaming connected mode control information (SOR-CMCI) from a control apparatus. In a case that a user controlled list of services exempted from release due to Steering of Roaming (SOR) is updated while one or more Tsor-cm timers are running, the controller checks whether ongoing service is included in the updated user controlled list of services exempted from release due to SOR. In a case that the ongoing service is not included in the updated user controlled list of services exempted from release due to SOR, and a current value of a Tsor-cm timer of the one or more Tsor-cm timers corresponding to the ongoing service is configured to infinity, the controller checks whether a matching criterion is included in the SOR-CMCI. In a case that the matching criterion for the ongoing service is not included in the SOR-CMCI, the controller configures a value of the Tsor-cm timer corresponding to the ongoing service to 0.

A communication control method according to an embodiment of the present invention is a communication control method performed by a User Equipment (UE; a terminal apparatus) and includes the steps of receiving Steering of roaming connected mode control information (SOR-CMCI) from a control apparatus; in a case that a user controlled list of services exempted from release due to Steering of Roaming (SOR) is updated while one or more Tsor-cm timers are running, checking, by the UE, whether ongoing service is included in the updated user controlled list of services exempted from release due to SOR; in a case that the ongoing service is not included in the updated user controlled list of services exempted from release due to SOR, and a current value of a Tsor-cm timer of the one or more Tsor-cm timers corresponding to the ongoing service is configured to infinity, checking, by the UE, whether a matching criterion is included in the SOR-CMCI; and in a case that the matching criterion for the ongoing service is not included in the SOR-CMCI, configuring, by the UE, a value of the Tsor-cm timer corresponding to the ongoing service to 0.

Advantageous Effects of Invention

According to the present invention, in a 5GS, eCPSOR_CON can be supported, and a NW can control timing at which a UE transitions from a connected mode to an idle mode.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. Overview of System

Figure 1:
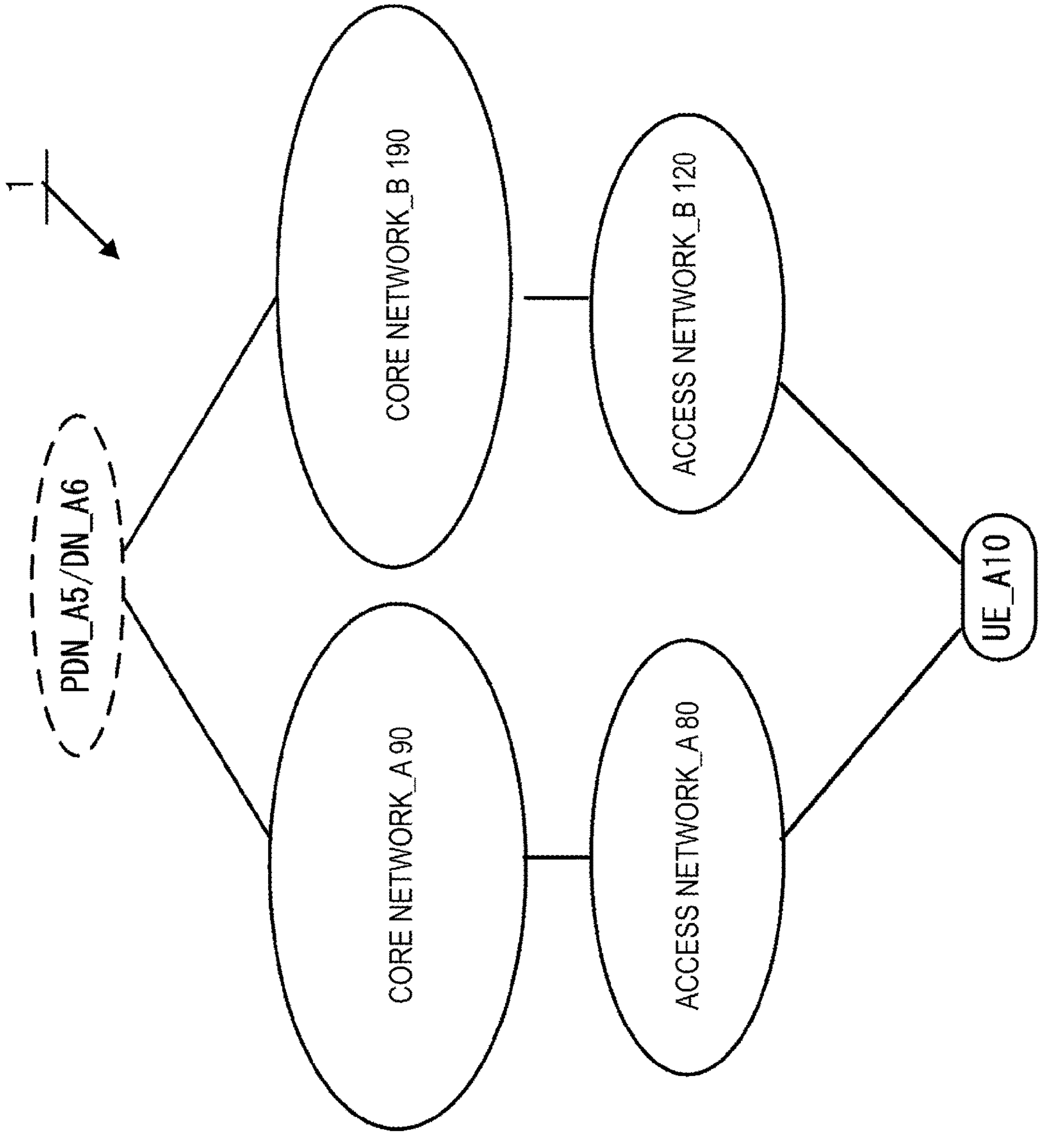
FIG. 1 is a diagram illustrating an overview of a mobile communication system (EPS/5GS).
Figure 2:
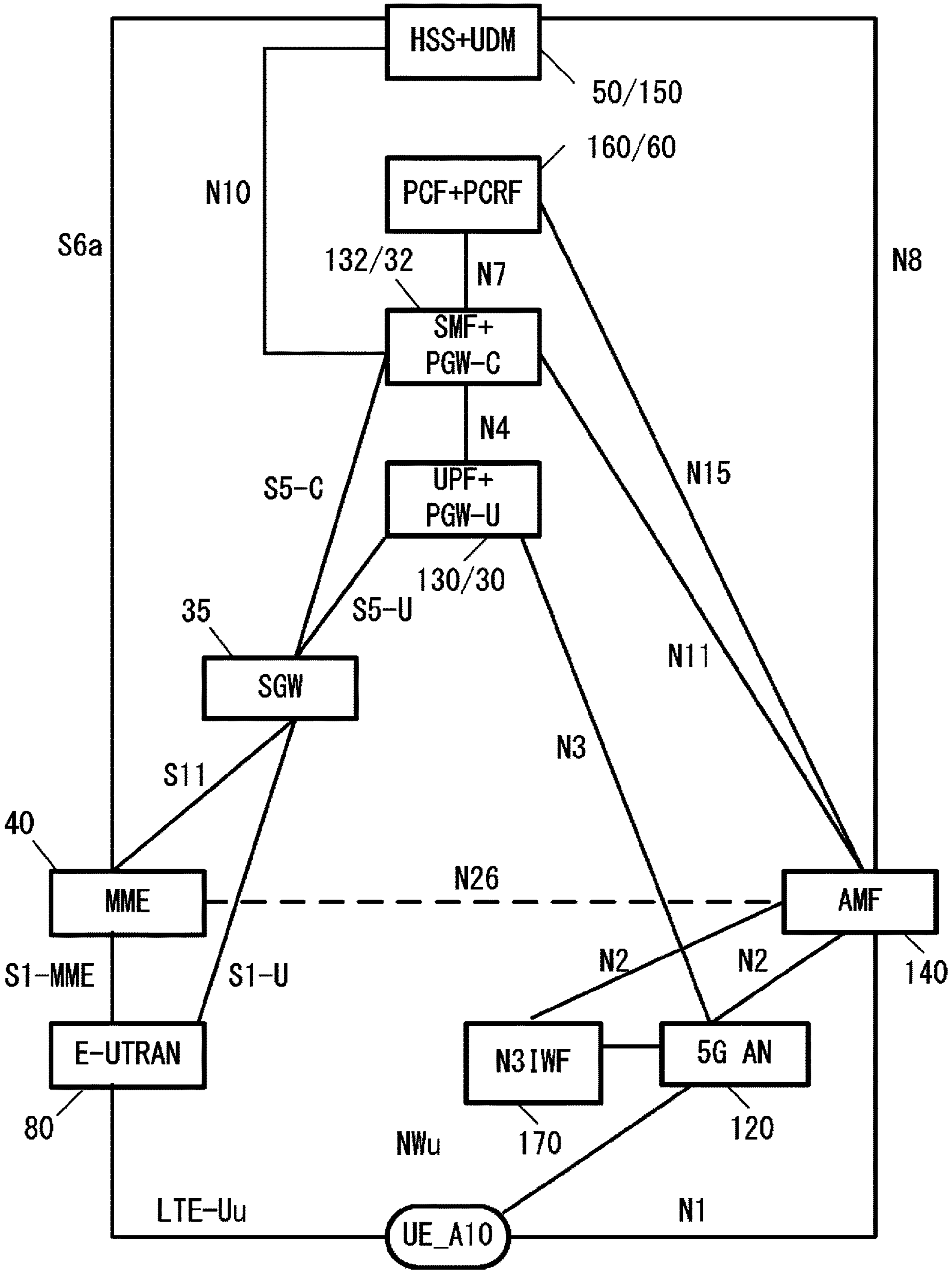
FIG. 2 is a diagram illustrating a detailed configuration of the mobile communication system (EPS/5GS).

First, FIG. 1 is a diagram for illustrating an overview of a mobile communication system 1 used in each embodiment, and FIG. 2 is a diagram for illustrating a detailed configuration of the mobile communication system 1.

FIG. 1 illustrates the mobile communication system 1 including a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted, such as in an eNB. The gNB is a node that provides a New Radio (NR) user plane and control plane to the UE, and is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or a trusted non-3GPP access network. Here, the untrusted non-3GPP access network may be a non-3GPP access network, such as a public wireless LAN, without security management performed in the access network, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication operator (Mobile Network Operator (MNO)) connecting the access network (the access network_A and/or the access network_B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

The core network (the core network_A and/or the core network_B) and the access network (access network_A and/or the access network_B) may differ for each mobile communication operator.

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. Each IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

Apparatuses which are not illustrated in FIG. 2 may be included in the access network_A, the core network_A, the access network_B, the core network_B, the PDN_A, and the DN_A. For example, the core network_A and/or the core network_B and/or PDN_A and/or DN_A may include an Authentication Server Function (AUSF) and an Authentication, authorization, and accounting (AAA) server (AAA-S). The AAA server may be disposed outside the core network.

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

Also, the AAA server is an apparatus that is connected directly to the AUSF or indirectly to the AUSF via another network apparatus and has authentication, approval, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a 3rd party.

Note that, although each of the apparatuses and functions is illustrated one by one for simplicity in FIG. 2, multiple similar apparatuses and functions may be included in the mobile communication system 1. Specifically, multiple apparatuses and functions such as the UE_As 10, the E-UTRANs 80, the MMEs 40, the SGWs 35, the PGW-Us 30, the PGW-Cs 32, the PCRFs 60, the HSSs 50, the 5G ANs 120, the AMFs 140, the UPFs 130, the SMFs 132, the PCFs 160, and/or the UDMs 150 may be included in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
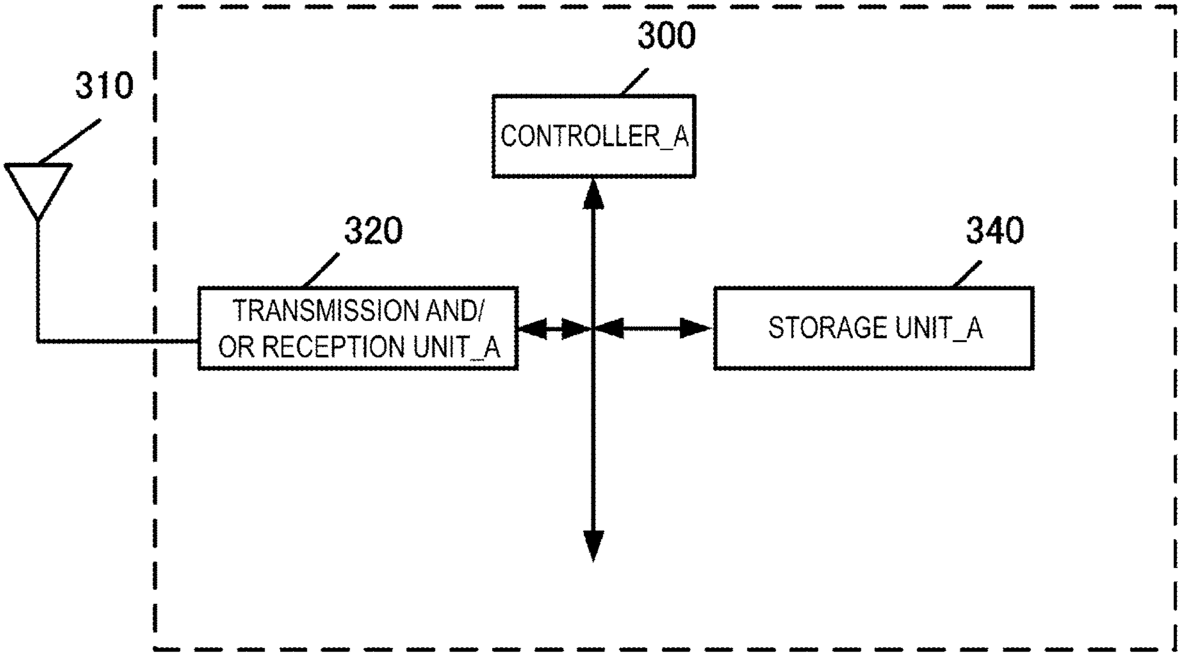
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Following is a detailed description with reference to FIG. 2. With the use of the transmission and/or reception unit_A 320, the UE can communicate with the base station apparatus (eNB) in the E-UTRAN over the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF over the N1 interface with the use of the transmission and/or reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

Note that the UE may be a Mobile Station (MS).

2.2. Apparatus Configuration of gNB

Figure 4:
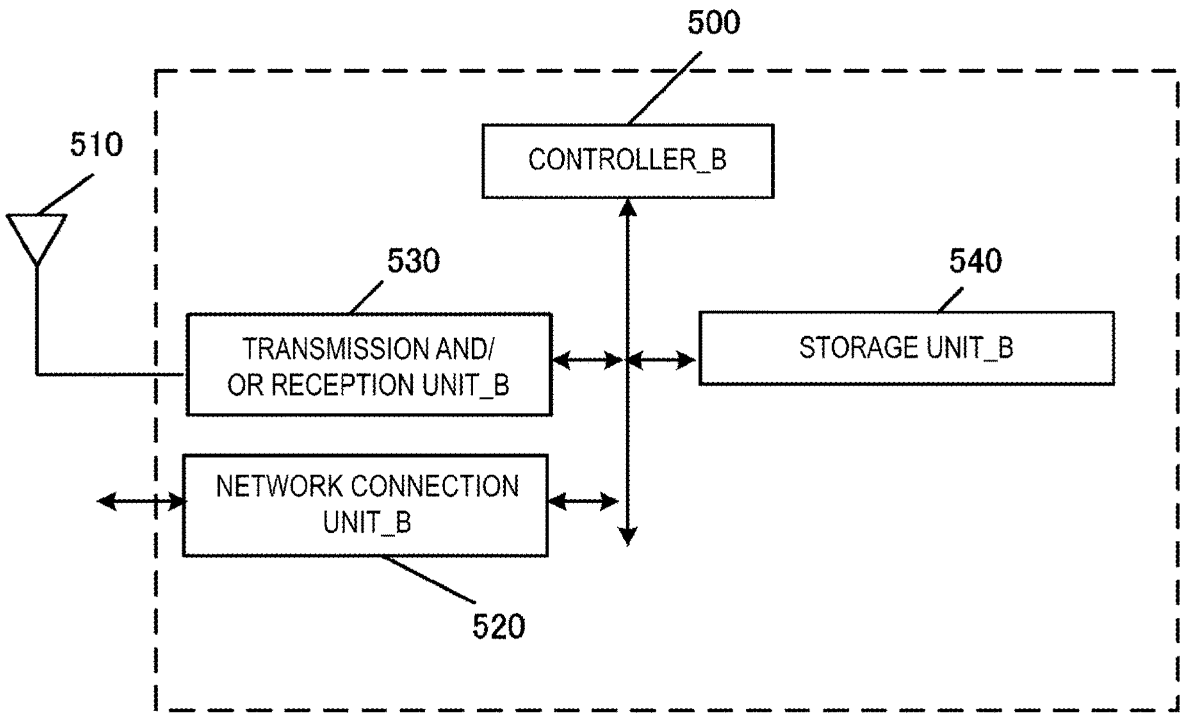
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Following is a detailed description with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
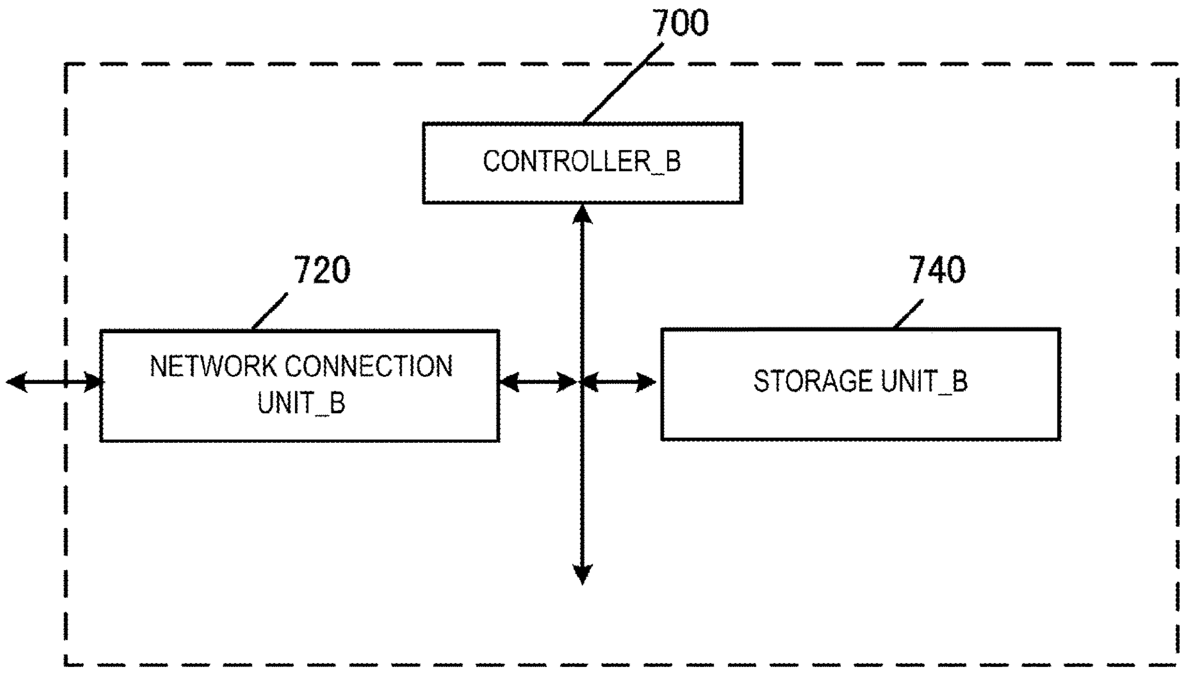
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB) in the 5G AN, and/or the SMF 132, and/or the PCF, and/or the UDM, and/or the SCEF. In other words, with the use of the network connection unit_B 720, the AMF can transmit and/or receive user data and/or control information to and/or from the base station apparatus (gNB) in the 5G AN, and/or the SMF 132, and/or the PCF, and/or the UDM, and/or the SCEF.

Following is a detailed description with reference to FIG. 2. With the use of the network connection unit_A 620, the AMF in the 5GCN can communicate with the gNB over the N2 interface, can communicate with the UDM over the N8 interface, can communicate with the SMF 132 over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is in 5GMM-REGISTERED, the UE_A 10 may start transmission and/or reception of user data and a control message, or may respond to paging. In addition, note that, in a case that each apparatus is in 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is in 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signalling connection established with the AMF via the N1 interface. In the CM-IDLE state, the UE does not have connection of the N2 interface (N2 connection) nor connection of the N3 interface (N3 connection). In contrast, in the CM-CONNECTED state, the UE has NAS signalling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state over 3GPP access and the CM state over non-3GPP access. In this case, the CM state over 3GPP access may include a non-connected state over 3GPP access (CM-IDLE state over 3GPP access) and a connected state over 3GPP access (CM-CONNECTED state over 3GPP access). In addition, the CM state over non-3GPP access may include a non-connected state over non-3GPP access (CM-IDLE state over non-3GPP access) and a connected state over non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state over 3GPP access may be referred to as a 5GMM non-connected mode over 3GPP access (5GMM-IDLE mode over 3GPP access), and the connected state over 3GPP access may be referred to as a 5GMM connected mode over 3GPP access (5GMM-CONNECTED mode over 3GPP access). In addition, the non-connected state over non-3GPP access may be referred to as a 5GMM non-connected mode over non-3GPP access (5GMM-IDLE mode over non-3GPP access), and the connected state over non-3GPP access may be referred to as a 5GMM connected mode over non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus and/or a function deployed between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Following is a detailed description with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB) in the 5G AN, and/or the SMF, and/or the DN. In other words, with the use of the network connection unit_B 720, the UPF can transmit and/or receive user data and/or control information to and/or from the base station apparatus (gNB) in the 5G AN, and/or the SMF, and/or the DN.

Following is a detailed description with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QOS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signalling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Terms in Present Embodiment

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

In addition, the network may refer to a Public Land Mobile Network (PLMN), or may refer to an NPN to be described later. In addition, the expression "the UE performs network selection" may mean that the UE performs PLMN selection, or may mean that the UE performs SNPN selection.

A Session Management (SM) message (also referred to as a Non-Access-Stratum (NAS) SM message) may be an NAS message used in a procedure for SM or may be a control message transmitted and/or received between the UE_A 10 and the SMF 132 via the AMF 140. Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like.

Furthermore, the SM message is a message transmitted and/or received in an N1 SM container included in a NAS message and/or an MM message transmitted and/or received on the N1 interface and the N11 interface.

The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by a network (NW).

A Mobility management (MM) message (also referred to as a NAS MM message) may be a NAS message used in a procedure for MM, or may be a control message transmitted and/or received between the UE_A 10 and the AMF 140. Furthermore, the MM message may include a Registration request message, a Registration accept message, a Registration reject message, a Registration complete message, a De-registration request message, a De-registration accept message, a configuration update command message, a configuration update complete message, a Service request message, a Service accept message, a Service reject message, a Notification message, a Notification response message, and the like.

Furthermore, the MM message may include an uplink NAS transport message (UL NAS TRANSPORT message) and a downlink NAS transport message (DL NAS TRANSPORT message).

Furthermore, the MM message is a NAS message transmitted and/or received on the N1 interface. The MM message may be included in an RRC message and transmitted and/or received between the UE and the 5G AN (or the gNB).

The procedure for MM or the MM procedure may include a Registration procedure, a De-registration procedure, a Generic UE configuration update procedure, an authentication and authorization procedure, a Service request procedure, a Paging procedure, and a Notification procedure.

Furthermore, the MM procedure may include a NAS transport procedure, a UE-initiated NAS transport procedure, and a NW-initiated NAS transport procedure (Network-initiated NAS transport procedure).

Here, the registration procedure is a procedure for registration with the access network_B, and/or the core network_B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the present procedure in a case that a running back-off timer or another timer expires. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. Furthermore, the UE may initiate the registration procedure, based on completion of the registration procedure, completion of a generic UE configuration update procedure, completion of a UE policy management procedure, completion of the procedure for SM, or the like. Note that these are not restrictive, and the UE can perform the registration procedure at any timing.

Note that the above-described procedure for the UE to transition from the state (deregistered state) of not being registered with the network to the state (registered state) of being registered therewith may be an initial registration procedure or a registration procedure for initial registration. The registration procedure performed in the state (registered state) in which the UE is registered with the network may be a registration procedure for mobility and periodic registration update or a mobility and periodic registration procedure.

The generic UE configuration update procedure may be initiated in a case that the AMF updates configuration of the UE regarding access and mobility management-related parameters. The generic UE configuration update procedure may be initiated in a case of requesting the UE to perform the registration procedure for mobility and periodic registration update in order to update the access and mobility management-related parameters. Furthermore, the UE may initiate the generic UE configuration update procedure, based on completion of the registration procedure, completion of the generic UE configuration update procedure, completion of the UE policy management procedure, completion of the procedure for SM, or the like.

The generic UE configuration update procedure is initiated by the AMF transmitting a Configuration update command to the UE via the access network.

The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

There are two Access types, namely a 3GPP access and a non-3GPP access. Here, it is only necessary for information indicating an access type to be configured as an Access type Information Element (IE), and for example, the information may be identification information indicating an access type to be used in signalling or user data transmission and reception between the UE and the core network.

An Access Technology means the type of a wireless access technology of the 3GPP access and includes NG-RAN, E-UTRAN, UTRAN, GERAN, or the like. The access technology is also referred to as an access technology. Note that the access technology may be identified by access network identification information (Access Technology Identifier). Furthermore, the access network identification information may be information by which it is possible to identify the access technology and an operation mode of the access technology.

A single registration mode is a mode in which the UE_A 10 maintains a common registered state for the 5GMM state and an EMM state in a case that the UE_A 10 can use an N1 mode and an S1 mode.

A dual registration mode is a mode in which the UE_A 10 maintains a registered state with the 5GMM state and the EMM state being independent of each other in a case that the UE_A 10 can use the N1 mode and the S1 mode. Note that, in a case of the dual registration mode, the UE_A 10 may be registered with the network only in the N1 mode (that is, registered with only the 5GC), may be registered with the network only in the S1 mode (registered with only the EPC), or may be registered with the network both in the N1 mode and the S1 mode (registered with both of the 5GC and the EPC).

In order to perform interworking between the 5GS and the EPC, the UE supporting both of the 5GC and the EPC NAS can operate in the single registration mode or the dual registration mode.

The S1 mode is a mode in which the UE_A 10 is allowed to access the EPC via the E-UTRAN. In other words, the S1 mode may be a mode in which a message is transmitted and/or received using the S1 interface. Note that the S1 interface may include the S1-MME interface and the S1-U interface.

The N1 mode is a mode in which the UE_A 10 is allowed to access the 5GC via the 5G access network. In other words, the N1 mode may be a mode in which a message is transmitted and/or received using the N1 interface.

An Access Point Name (APN) may be identification information for identifying the core network and/or an external network such as the PDN. In addition, the APN can also be used as information for selecting a gateway such as the PGW_A 30/UPF_A 235 connecting the core network_A 90.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using the PDU session.

Note that each apparatus (the UE, and/or the access network apparatus, and/or the core network apparatus) may associate one or more pieces of identification information with a PDU session for management. Note that these pieces of identification information may include one or more of an S-NSSAI, a DNN, a QoS rule, a 5QI, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF_A 235 connecting the core network_B190. In addition, the DNN may correspond to an Access Point Name (APN).

Note that the PDU session established using the DNN means a state in which the UE receives the DNN from the network and establishes the PDU session associated with the received DNN in the PDU session establishment procedure.

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a (mobile) network operator, and the operator can be identified by a PLMN ID. In the present document, the PLMN may mean the PLMN ID. A PLMN that matches a Mobile Network Code (MNC) and a Mobile Country Code (MCC) of an International Mobile Subscriber Identity (IMSI) of the UE may be a Home PLMN (HPLMN). The PLMN may mean a core network.

Furthermore, the UE may hold, in a USIM, an Equivalent HPLMN list for identifying one or more Equivalent HPLMNs (EHPLMNs). A PLMN different from the HPLMN and/or the EHPLMN may be a Visited PLMN (VPLMN).

Furthermore, the EHPLMN may be referred to as an equivalent PLMN. Conversely, the equivalent PLMN may refer to the EHPLMN.

Here, the equivalent PLMN is a PLMN regarded as a PLMN the same as any PLMN in the network. For example, the equivalent PLMN may be one or more PLMNs regarded as being the same as the registered PLMN.

The registered PLMN is a PLMN with which the UE is registered. In other words, the PLMN with which the UE has been successfully registered may be a Registered PLMN (RPLMN). Each apparatus may receive and/or hold and/or store, from the RPLMN, an Equivalent PLMN list for identifying one or more Equivalent PLMNs (EPLMNs) that can be used equivalently to the RPLMN in the PLMN selection performed by the UE.

The current PLMN may be a PLMN requested by the UE and/or a PLMN selected by the UE and/or the RPLMN and/or the PLMN allowed by the network and/or the PLMN to which the core network apparatus transmitting and/or receiving messages belongs to.

The requested PLMN means a message transmission destination network in a case that the UE transmits a message. Specifically, the requested PLMN may be a PLMN selected by the UE in a case that the UE transmits a message. The requested PLMN may be a current PLMN requested by the UE. Also, the requested PLMN may be a registered PLMN in a case that the UE is in a registered state.

The Stand-alone Non-Public Network (SNPN) is a network identified with an SNPN ID including a combination of the PLMN ID and a Network identifier (NID), to which only specific UEs are allowed to connect. The SNPN may mean a core network. Here, the UE allowed to be connected to the SNPN may be an SNPN enabled UE.

Furthermore, the UE may hold, in a USIM, an Equivalent SNPN list for identifying one or more Equivalent SNPNs (ESNPNs). An SNPN different from the HSNPN and/or the ESNPN may be a Visited PLMN (VPLMN).

The SNPN with which the UE has been successfully registered may be a Registered SNPN (RSNPN). Each apparatus may receive and/or hold and/or store, from the RSNPN, an Equivalent SNPN list for identifying one or more Equivalent PLMNs (ESNPNs) that can be used equivalently to the RSNPN in the PLMN selection or SNPN selection performed by the UE.

The 5G QOS Identifier (5QI) may be a scalar used with reference to characteristics of the QoS (5G QoS characteristics). Here, the characteristics of the QoS may be access node-specific parameters, and information indicating specific QoS forwarding operations, such as a packet loss rate and a packet delay budget.

Note that the PDU session established using the 5QI means a state in which the UE receives the 5QI from the network and establishes the PDU session associated with the received 5QI in the PDU session establishment procedure.

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be mapped. Here, the NF is a processing function in a network, and is adopted or defined in 3GPP. The NSI is an entity of one or more NSs configured in the core network_B. The NSI may include a virtual Network Function (NF) generated using a Network Slice Template (NST).

Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. Each NF configured in the NS may or may not be an apparatus shared with another NS.

The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more pieces of S-NSSAI in the registration information of the UE as default S-NSSAI. Note that, in a case that the S-NSSAI is a default S-NSSAI, and the UE does not transmit, to a network, a valid S-NSSAI in a registration request message, the network may provide an NS related to the UE.

Also, the S-NSSAI transmitted and/or received between the UE and the NW may be referred to as an S-NSSAI Information element (IE). Furthermore, the S-NSSAI IE transmitted and/or received between the UE and the NW may include the S-NSSAI including the SST and/or the SD of the registered PLMN and/or the SST and/or the SD indicating the S-NSSAI of the HPLMN with the S-NSSAI mapped therein. One or more pieces of S-NSSAI stored in the UE and/or the NW may include the SST and/or the SD, or include the S-NSSAI including the SST and/or the SD and/or the SST and/or the SD indicating the S-NSSAI of the HPLMN with the S-NSSAI mapped therein.

Note that the PDU session established using the S-NSSAI means a state in which the UE receives the S-NSSAI from the network and establishes the PDU session associated with the received S-NSSAI in the PDU session establishment procedure.

The Network Slice Selection Assistance Information (NSSAI) is a set of pieces of the S-NSSAI. Each piece of the S-NSSAI included in the NSSAI is information for assisting the access network or the core network to select the NSI. The UE may store the NSSAI allowed by the network for each PLMN. The NSSAI may be information used for selecting the AMF. The UE may apply, to the PLMN and the EPLMN, each piece of NSSAI (allowed NSSAI and/or configured NSSAI and/or rejected NSSAI and or pending NSSAI and/or first NSSAI).

The mapped S-NSSAI is the S-NSSAI of the HPLMN mapped to the S-NSSAI of the registered PLMN in a roaming scenario. The UE may store one or more pieces of mapped S-NSSAI mapped to the S-NSSAI included in the configured NSSAI and the allowed NSSAI of each access type. Furthermore, the UE may store one or more pieces of mapped S-NSSAI of the S-NSSAI included in the first NSSAI and/or the rejected NSSAI and/or the pending NSSAI.

Configured NSSAI is NSSAI fed and stored in the UE. The UE may store the configured NSSAI for each PLMN. The UE may store the configured NSSAI in association with the PLMN. Note that in the present document, the configured NSSAI associated with the PLMN may be referred to as configured NSSAI with respect to the PLMN, configured NSSAI of the PLMN, configured NSSAI for the PLMN, or configured NSSAI associated with the PLMN. The UE may store configured NSSAI that is not associated with the PLMN and is valid for all the PLMNs, and such configured NSSAI may be defined as "default configured NSSAI".

The configured NSSAI may be associated with multiple PLMNs, and these multiple PLMNs may be EPLMNs.

The configured NSSAI may be information configured by the network (or PLMN). The S-NSSAI included in the configured NSSAI may be referred to as configured S-NSSAI. The configured S-NSSAI may include S-NSSAI and mapped S-NSSAI. Alternatively, the S-NSSAI of the PLMN may be referred to as "configured S-NSSAI", and the S-NSSAI with the configured S-NSSAI mapped to the HPLMN may be referred to as "mapped S-NSSAI with respect to configured NSSAI for the PLMN".

The configured NSSAI may be updated by the NW at any timing, or based on the update, the updated configured NSSAI may be transmitted from the NW to the UE.

Requested NSSAI is NSSAI provided to the network from the UE during the registration procedure. In the registration procedure, the S-NSSAI included in the requested NSSAI transmitted by the UE may be S-NSSAI included in the allowed NSSAI or the configured NSSAI stored in the UE. In the PDU session establishment procedure, the S-NSSAI included in the requested NSSAI transmitted by the UE may be S-NSSAI included in the allowed NSSAI stored in the UE.

The requested NSSAI may be information indicating a network slice requested by the UE. The S-NSSAI included in the requested NSSAI may be referred to as requested S-NSSAI. For example, the requested NSSAI is included, for transmission, in a Non-Access-Stratum (NAS) message transmitted and/or received from the UE to the network, such as a registration request message or a PDU session establishment request message, or in a Radio Resource Control (RRC) message including the NAS message. Here, in a roaming case, the requested NSSAI may include an S-NSSAI of the VPLMN and a mapped S-NSSAI of the HPLMN. In other words, the S-NSSAI (requested S-NSSAI) included in the requested NSSAI may include an S-NSSAI and a mapped S-NSSAI.

The allowed NSSAI is information indicating one or more network slices allowed for the UE. In other words, the allowed NSSAI is information identifying a network slice to which the UE is allowed by the network to connect. The allowed NSSAI may be allowed NSSAI stored by the UE and/or the NW, or allowed NSSAI transmitted from the NW to the UE.

The UE and/or the NW may store and manage the allowed NSSAI for each access (the 3GPP access or the non-3GPP access), as information regarding the UE. The UE and/or the NW may further manage the allowed NSSAI in association with the registration area.

Furthermore, the UE and/or the NW may store and manage the allowed NSSAI in association with the PLMN, as information regarding UE. The allowed NSSAI may be associated with multiple PLMNs, and these multiple PLMNs may be EPLMNs.

Note that in the present document, the allowed NSSAI associated with the PLMN and the access type may be referred to as allowed NSSAI with respect to the PLMN and the access type or allowed NSSAI with respect to the access type of the PLMN. The S-NSSAI included in the allowed NSSAI may be referred to as an allowed S-NSSAI. The allowed S-NSSAI may include S-NSSAI and mapped S-NSSAI.

The rejected NSSAI is information indicating one or more network slices that the UE is not allowed to use or request. In other words, the rejected NSSAI is information for identifying a network slice to which the UE is not allowed by the network to connect. The rejected NSSAI transmitted from the NW to the UE may be included in a rejected NSSAI IE or an Extended rejected NSSAI IE. The rejected NSSAI transmitted and/or received using the rejected NSSAI IE may be information including one or more combinations of the S-NSSAI and a reject cause value. The rejected NSSAI transmitted and/or received using the Extended rejected NSSAI IE may be information including one or more combinations of the S-NSSAI, the mapped S-NSSAI, and the reject cause value in a case of roaming.

Here, the S-NSSAI included in the rejected NSSAI may be associated with the PLMN ID or the SNPN ID. Note that the PLMN or the SNPN indicated by the PLMN ID or the SNPN ID associated with the S-NSSAI included in the rejected NSSAI may be the current PLMN or the current SNPN. Alternatively, the PLMN ID or the SNPN ID associated with the S-NSSAI included in the rejected NSSAI may be information indicating the HPLMN or the HSNPN, regardless of the current PLMN or SNPN.

Here, the reject cause value is information indicating why the network rejects the corresponding S-NSSAI. Each UE and/or network may appropriately store and manage the rejected NSSAI based on the reject cause value associated with each piece of S-NSSAI.

Furthermore, the rejected NSSAI may be included in the NAS message transmitted from the network to the UE, such as the registration accept message, the configuration update command, or the registration reject message, or in the RRC message including the NAS message. The S-NSSAI included in the rejected NSSAI may be referred to as a rejected S-NSSAI.

The UE and/or the NW may store and manage the rejected NSSAI in association with the PLMN, as information regarding the UE. The rejected NSSAI may be associated with multiple PLMNs, and these multiple PLMNs may be EPLMNs.

The Session and Service Continuity (SSC) mode indicates a mode of Session and Service Continuity supported by the system and/or each apparatus in the 5G system (5GS). More specifically, the SSC mode may be a mode indicating a type of session and service continuity supported by a PDU session that is established between the UE_A 10 and the UPF. Note that the SSC mode may be a mode indicating the type of session and service continuity configured for each PDU session. Furthermore, the SSC mode may include three modes of SSC mode 1, SSC mode 2, and SSC mode 3. Note that the SSC mode associated with the PDU session need not be changed while the PDU session is alive.

Radio Resource Control (RRC) connection is connection established between the UE and the base station apparatus in the access network. More specifically, the RRC connection is connection established in a Uu reference point between the UE and the base station apparatus in the access network. The RRC connection may include a radio bearer. In addition, the RRC connection may be connection established in 3GPP access. In addition, the RRC connection may be connection established in an RRC layer under a NAS layer. In addition, the RRC connection may be connection established and/or released in transmission and/or reception of an RRC message of the RRC layer. In addition, the RRC connection may be connection suspended in transmission and/or reception of an RRC message in the RRC layer.

5GMM-CONNECTED mode with RRC inactive indication is a state indicating that the state of the NAS layer is in a connected state even though the RRC layer is in an inactive state. In other words, 5GMM-CONNECTED mode with RRC inactive indication may be a state in which a radio bearer is released while NAS signalling connection and/or a context of the NAS signalling connection is maintained.

In addition, 5GMM-CONNECTED mode with RRC inactive indication may be a state in which the RRC connection is suspended. More specifically, 5GMM-CONNECTED mode with RRC inactive indication may be a state in which the RRC connection is suspended while the state of the NAS layer is in a connected state. In other words, 5GMM-CONNECTED mode with RRC inactive indication may be a state in which the RRC connection is suspended while the NAS signalling connection and/or the context of the NAS signalling connection is maintained.

Here, the UE may transition from 5GMM-CONNECTED mode to 5GMM-CONNECTED mode with RRC inactive indication, based on reception of information indicating that the RRC connection is suspended from a lower layer. In addition, the UE may transition, only for the state for 3GPP access, from 5GMM-CONNECTED mode to 5GMM-CONNECTED mode with RRC inactive indication, based on reception of information indicating that the RRC connection is suspended from a lower layer. Note that the information indicating that the RRC connection is suspended may be an indication indicating that the RRC connection is suspended.

Supporting 5GMM-CONNECTED mode with RRC inactive indication may mean that maintaining of a state of the NAS layer in the connected state is supported even in a case that a notification indicating that the RRC layer has become inactive is received from a lower layer. In addition, using 5GMM-CONNECTED mode with RRC inactive indication may mean that the state of the NAS layer is maintained in the connected state even in a case that a notification indicating that the RRC layer has become inactive is received from a lower layer.

PDU session with suspended user-plane resources is a PDU session in which user plane resources are established or re-established and a radio bearer is suspended. Here, timing at which the radio bearer is suspended may be timing at which the UE transitions to 5GMM-CONNECTED mode with RRC inactive indication. In addition, the radio bearer may be a data radio bearer.

The Non-Access Stratum (NAS) signalling connection is connectivity between the UE and the core network. More specifically, the NAS signalling connection is connectivity of the N1 mode between the UE and the AMF.

The NAS signalling connection may be connectivity via 3GPP access, or may be connectivity via non-3GPP access.

Specifically, in a case that the NAS signalling connection is connectivity via 3GPP access, the NAS signalling connection may include RRC connection via a Uu reference point and NG connection via an N2 reference point.

Conversely, in a case that the NAS signalling connection is connectivity via 3GPP access, the NAS signalling connection may include an IPsec tunnel via a NWu reference point and NG connection via an N2 reference point.

Here, the Uu reference point may be a reference point between the UE and the gNB. Furthermore, the NWu reference point may be a reference point between the UE and the N3IWF. Furthermore, the N2 reference point may be a reference point between the gNB or the N3IWF and the AMF.

Note that the NAS signalling connection may be referred to as NAS signalling connection. Furthermore, the NAS signalling connection may be referred to as N1 NAS signalling connection.

An Always-on PDU session is a PDU session in which the UE must activate user plane resources every time the state transitions from the 5GMM-IDLE state to the 5GMM-CONNECTED state. The UE can request the core network and/or the core network apparatus to establish a PDU session as the Always-on PDU session, based on an indication from an upper layer. The core network and/or the core network apparatus determines whether a PDU session can be established as the Always-on PDU session.

Here, the 5GMM-IDLE state may be the CM-IDLE state. Furthermore, the 5GMM-CONNECTED state may be the CM-CONNECTED state. Furthermore, the core network apparatus that determines whether a PDU session can be established as the Always-on PDU session may be the SMF.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

A TA list is a list including one or more TAs allocated to the UE_A 10 by the network. Note that while the UE_A 10 is moving within one or more TAs included in the TA list, the UE_A 10 may be able to move without performing a tracking area update procedure. In other words, for the UE_A 10, the TA list may be an information group indicating an area in which the UE_A 10 can move without performing the tracking area update procedure. Note that the TA list may be referred to as a TAI list including one or more Tracking area identities (TAIs), and the TAI list may hereinafter refer to a TA list.

The Registration area is a set of one or more TAs allocated to the UE by the AMF. Note that while moving within one or more TAs included in the registration area, the UE_A 10 may be able to move without transmitting and/or receiving a signal for updating the tracking area. In other words, the registration area may be an information group indicating an area in which the UE_A 10 can move without performing the tracking area update procedure. The registration area may be identified by a TAI list configured by one or more TAIs.

The TAI included in the TAI list may belong to one PLMN or may belong to multiple PLMNs. In a case that multiple pieces of TAI included in the TAI list belong to different PLMNs, the PLMNs may be EPLMNs.

A Local Area Data Network (LADN) refers to a DN to which the UE can connect only at a specific location, and provides connectivity with respect to a specific DNN (that is, an LADN DNN). The LADN may be a DN allowing connection by using a PDU session associated with a specific DNN at a specific location. In addition, the LADN may be a DN allowing connection by using a PDU session associated with a combination of a specific DNN and specific S-NSSAI at a specific location.

A PDU session for the LADN (PDU session for LADN) is a PDU session associated with a DNN associated with the LADN. The PDU session for the LADN may be a PDU session established with the LADN. In other words, the PDU session for the LADN may be a PDU session established between the UE and the LADN, or may be a PDU session used for user data communication between the UE and the LADN. Note that the PDU session for the LADN may be a PDU session that can be established only in the LADN service area. In other words, the UE may use a specific DNN at a specific location, and thereby be able to establish a PDU session for the LADN. In still other words, the UE may use a combination of a specific DNN and specific S-NSSAI at a specific location, and thereby be able to establish a PDU session for the LADN.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

SOR is an abbreviation of Steering of Roaming and means a method and a technique by which the UE is promoted to roam the network as a prioritized roaming destination (or recommended roaming destination) indicated by the HPLMN.

Steering of roaming connected mode control information (SOR-CMCI) is HPLMN information for controlling a timing at which the UE transition from the 5GMM connected mode to the 5GMM non-connected mode to perform the SOR. The SOR-CMCI may be included in SOR information and/or a SOR transport container (SOR transparent container) or may be transmitted and/or received by being included in another information element.

The SOR-CMCI may include criteria information and a first timer value. Furthermore, the criteria information and the first timer value may be associated with each other.

Here, the criteria information may include criteria belonging to a PDU session and/or criteria related to a service type and/or criteria belonging to all the types.

Furthermore, the criteria belonging to the PDU session may be criteria information for identifying the corresponding PDU session. Specifically, the criteria belonging to the PDU session may be criteria information including one or more of the S-NSSAI_A, the DNN_A, the 5QI_A, the access type, the PDU session type, and the PDU session ID_A.

Furthermore, the criteria related to the service type may be criteria information for identifying the corresponding service. Specifically, the criteria related to the service type may be criteria information including one or more of the IMS registration related signalling, the MMTEL voice call, the MMTEL video call, and the MO SMS over NAS or MO SMSoIP.

Furthermore, the criteria belonging to all the types may be criteria information that matches in any state.

Furthermore, the SOR-CMCI may include multiple pieces of criteria information. In a case that the multiple pieces of criteria information are included in the SOR-CMCI, the SOR-CMCI may include multiple first timer values. In this case, the criteria information and the first timer value may be associated in a one-to-one relationship.

In other words, in a case that multiple PDU sessions are established, the SOR-CMCI may include multiple pieces of criteria information and multiple first timer values. Moreover, the SOR-CMCI may include multiple pieces of criteria information and multiple first timer values even in a case that multiple services are being performed.

Furthermore, each piece of criteria information may also include priority. In other words, each piece of criteria information may also include information indicating priority of the criteria information.

Conversely, the SOR-CMCI may include only one piece of criteria information. In a case that the criteria information is included in only one piece of SOR-CMCI, the SOR-CMCI may include one first timer value. The criteria information and the first timer value may be associated in a one-to-one relationship in this case as well. Furthermore, in this case, the SOR information and/or the SOR transport container (SOR transparent container) may include one or more pieces of SOR-CMCI.

In other words, in a case that multiple PDU sessions are established, the SOR information and/or the SOR transport container may include multiple pieces of SOR-CMCI. Furthermore, also in a case that multiple services are performed, the SOR information and/or the SOR transport container may include multiple pieces of SOR-CMCI.

Furthermore, each piece of SOR-CMCI may include priority. In other words, each piece of SOR-CMCI may also include information indicating priority of the SOR-CMCI.

The SOR-CMCI may be determined based on an operator policy and may be information transmitted from the UDM to the UE.

The Steering of Roaming Connected Mode Control Information (SOR-CMCI) may be information that allows the network such as the HPLMN to control a timing at which the UE in a connected mode transitions to a non-connected mode for the SOR. The SOR-CMCI may be information based on an operator policy and/or an HPLMM policy. The SOR-CMCI may be information configured for each apparatus or may be information provided as a notification from the NW to the UE.

Each apparatus may manage and/or store multiple pieces of SOR-CMCI for the UE or may manage and/or store one piece of SOR-CMCI.

The SOR-CMCI may be configured to include criteria belonging to one or more PDU sessions and/or one or more service type criteria and/or criteria (condition) indicating a case of matching with all criteria.

The criteria belonging to one PDU session included in one piece of SOR-CMCI may include one piece of S-NSSAI and/or one DNN and/or one piece of 5QI. The criteria belonging to one PDU session included in one piece of SOR-CMCI may further include information indicating one access technology and/or information indicating one PDU session type and/or a value of one PDU session ID. In a case that the criteria belonging to one PDU session includes information belonging to multiple PDU sessions, it may mean the combination thereof.

In a case that multiple PDU sessions is established, one piece of SOR-CMCI may include criteria belonging to multiple PDU sessions. In this case, each of the criteria belonging to each PDU session may include one piece of S-NSSAI and/or one DNN and/or one piece of 5QI and/or information indicating an access technology and/or information indicating the PDU session type and/or a value of the PDU session ID.

Specifically, in a case that multiple PDU sessions is established, each piece of S-NSSAI used by each PDU session and/or each DNN and/or each piece of 5QI may be included in the SOR-CMCI, each access type for which each PDU session is established may be included in the SOR-CMCI, a PDU session type of each PDU session may be included in the SOR-CMCI, or a value of the PDU session ID for identifying each PDU session may be included in the SOR-CMCI.

The criteria belonging to one PDU session included in one piece of SOR-CMCI may include one or more pieces of S-NSSAI and/or one or more DNNs and/or one or more pieces of 5QI. The criteria belonging to one PDU session included in one piece of SOR-CMCI may further include information indicating one or more access technologies and/or information indicating one or more PDU session types and/or values of one or more PDU session IDs.

One service type criterion included in one piece of SOR-CMCI may include information for identifying one or more service types and may include information indicating MMTEL voice call and/or information indicating MMTEL video call and/or information indicating MO SMS over NAS and/or information indicating MO SMSoIP.

In a case that multiple services are being performed, one piece of SOR-CMCI may include multiple service type criteria. In this case, each service type criterion may include information indicating MMTEL voice call and/or information indicating MMTEL video call and/or information indicating MO SMS over NAS and/or information indicating MO SMSoIP.

Specifically, in a case that multiple services are being performed, information for identifying each service may be included in the SOR-CMCI.

Hereinafter, each criterion may mean a criterion belonging to a PDU session and/or a service type criterion and/or a criterion (condition) indicating a case of matching all criteria or may be each piece of information (the S-NSSAI, the DNN, the 5QI, or the like) belonging to a PDU session included in the criterion belonging to the PDU session and/or information for identifying a service type included in a service type criterion and/or information indicating a case of matching all criteria.

The SOR-CMCI may include a mapped timer value associated with each criterion. In a case that the SOR-CMCI includes the timer value mapped to the criteria indicating a case that all criteria are matched, the timer value may be configured to be shorter than timer values mapped to other criteria.

The SOR-CMCI may include a value indicating priority associated with each criterion. The value indicating priority may be referred to as a precedence value and the priority of one or more criteria may be determined based on the precedence value. Alternatively, the priority may be indicated by an order of the criteria included in the SOR-CMCI. Specifically, the criteria may be sorted and managed such that the criteria with higher priority are located at higher positions.

Steering of roaming (SOR) information may be information of the SOR including information protected by the HPLMN. The Steering of roaming information may include information indicating whether to request acknowledgement (Ack) that is a response indicating successful reception of the Steering of roaming information from the UE.

The SOR information may include information indicating a list of combinations of recommended (or prioritized) PLMNs and access technologies and indicating that it (the list) is included, or information indicating a packet is secured and indicating that it (the packet) is included, and information indicating that the information indicating the lists of the combinations of the recommended PLMNs and the access technologies is not included in the Steering of roaming information since there is no need to change the list of the combinations of the recommended PLMNs and the access technologies stored in the UE.

The SOR information and an Ack that is a response indicating that the UE has successfully received the SOR information may be transmitted and/or received by being included in the SOR transport container information element (SOR transparent container information element) included in the NAS message.

N1 NAS signalling connection is connection between the UE and the network (AMF) and may be managed and present independently on the 3GPP access and on the non-3GPP access.

A state where the N1 NAS signalling connection is established may be a 5GMM-CONNECTED mode. A state where the N1 NAS signalling connection is not established may be a 5GMM-IDLE mode.

In other words, the state where the N1 NAS signalling connection is established on the 3GPP access may be referred to as a state where the UE is in a 5GMM connected mode over 3GPP access (5GMM-CONNECTED mode over 3GPP access), and the state where the N1 NAS signalling connection is not established on the 3GPP access may be referred to as a state where the UE is in a 5GMM non-connected mode over 3GPP access (5GMM-IDLE mode over 3GPP access).

Similarly, a state where the N1 NAS signalling connection is established on the non-3GPP access may be referred to as a state where the UE is in a 5GMM connected mode over non-3GPP access (5GMM-CONNECTED mode over non-3GPP access), and a state where the N1 NAS signalling connection is not established on the non-3GPP access may be referred to as a state where the UE is in a 5GMM non-connected mode over non-3GPP access (5GMM-IDLE mode over non-3GPP access).

The service type may be a type of a service that can be performed by the UE and/or a service that is being performed by the UE. Specifically, the service indicated by the service type may be IMS registration related signalling and/or MMTEL voice call and/or MMTEL video call or MO SMS over NAS (SMSoNAS) and/or MO SMSoIP, or the like.

Note that the IMS may be an abbreviation of IP Multimedia Subsystem. The MMTEL may be an abbreviation of multimedia telephony service. The SMS may be an abbreviation of Short Message Service. The NAS may be an abbreviation of Non-Access-Stratum. The MO may be an abbreviation of Mobile Originated. SMSoIP may be an abbreviation of SMS over IP (networks).

The service type may be a type of access attempt and/or an access category or may indicate a service indicated by such information.

The type of access attempt is a type categorized by a trigger for starting an access in a case that the UE attempts an access (in a case that the UE starts the access attempt) and may be used to determine the access category.

The access category is a category determined by the UE based on the type of the access attempt. In a case that the UE stores operator-defined access category definitions, the UE may use the operator-defined access category definitions to determine the access category.

Modes of the UE in selection of the PLMN include an Automatic Network Selection Mode and a Manual Network Selection Mode. Note that, in the present document, the automatic network selection mode is also referred to as an automatic mode, and the manual network selection mode is also referred to as a manual mode.

The automatic mode in selection of the PLMN is a mode in which PLMN selection is performed automatically. The UE in the automatic mode selects a combination of the PLMN and the access technology stored in the UE, based on order of priority. Specifically, in the automatic mode, in PLMN selection by the UE (or the MS), the combination of the PLMN and the access technology that is available for the UE and has the highest priority is selected.

The manual mode in selection of the PLMN is a mode in which a user (a user of the UE or the MS) performs PLMN selection manually. In the manual mode, the UE (or the MS) shows one or more selectable PLMNs to the user, and roaming to the VPLMN is performed only in a case that the user selects one.

A first timer is a timer for determining a timing at which the UE in the connected mode transitions to the non-connected mode for the SOR. The first timer may be a timer for SOR. Furthermore, the first timer may be Tsor-cm of 3GPP. In other words, the first timer may be a Tsor-cm timer.

Furthermore, the first timer may be managed by the UE and/or the NW. The first timer may be managed for each PDU session, may be managed for each access type, may be managed for each combination of the PDU session and the access type, may be managed for each service type, may be managed for each PLMN, or may be managed for each UE. The timer value to be set for the first timer may be referred to as a first timer value below.

In other words, one or more first timers may be managed for one UE, or one first timer may be managed for one UE. The first timer managed by the UE may store a PDU session ID and/or information indicating an access type and/or information indicating a combination of a PDU session and an access type and/or a service type and/or a PLMN ID in an associated manner.

A criterion with which a selected timer value is associated based on the SOR-CMCI used in selecting the timer value to be set for the first timer and/or information belonging to a PDU session included in the criterion and/or information indicating a service type included in the criterion and/or information indicating the priority with which the criterion is associated may be managed in an associated manner with the first timer and/or the first timer value.

The PDU session identified by the information with which the first timer is associated or the PDU session using the information with which the first timer is associated may be referred to as a PDU session associated with the first timer, and the service identified by the information with which the first timer is associated may be referred to as a service associated with the first timer.

Note that the expression that the first timer is managed here means that the first timer is started and/or stopped and/or expired and/or run. In other words, the expression that the UE and/or the NW manages the first timer means that the UE and/or the NW starts and/or stops and/or expires and/or runs the first timer, and a state where the UE and/or the NW is managing the first timer means that the UE and/or the NW is running the first timer.

Here, setting of the timer value to the timer in the present document may be performed after selection of the timer value, or may be performed in a case of starting the timer. In other words, for example, the SOR-CMCI including the timer value may be received and the timer value may be selected based on the SOR-CMCI, and then the timer value may be immediately set to the timer so that, in a case of performing the timer, the timer may be started based on the set timer value, or alternatively, for example, the SOR-CMCI including the timer value may be received and the timer value may be selected based on the SOR-CMCI, and then the timer value may be set to the timer at timing of performing the timer so that the timer may be started. In the following, in the present document, only one example among these may be described; however, setting of the timer value to the timer may be performed at one of these timings, or is not limited to these.

Specifically, in a state where multiple PDU sessions are being established, the UE and/or the NW may manage the first timer for each PDU session or manage only one first timer.

Furthermore, in a case that the UE and/or the NW establishes a first PDU session and a second PDU session on the 3GPP access and establishes a third PDU session and a fourth PDU session on the non-3GPP access, the UE and/or the NW may manage the first timer associated with the 3GPP access and the first timer associated with the non-3GPP access or may manage multiple first timers associated with each of the first to fourth PDU sessions at the same time.

Furthermore, in a case that the UE and/or the NW establishes an MA PDU session that establishes user plane resources on both the 3GPP access and the non-3GPP access, the UE and/or the NW may manage the first timer associated with the MA PDU session or may manage the first timer associated with the 3GPP access and the first timer associated with the non-3GPP access at the same time.

A user controlled list for SOR exemption is a list for the user of the UE to control services exempted from release due to SOR. The user controlled list for SOR exemption may be a "user controlled list of services exempted from release due to SOR". Furthermore, description of the "user controlled list of services exempted from release due to SOR" may mean the user controlled list for SOR exemption. Furthermore, the user controlled list for SOR exemption may be a list configured for the UE.

Furthermore, the user controlled list for SOR exemption may be a list indicating a list of services exempted from release due to SOR. In other words, the user controlled list for SOR exemption is a list indicating a list of service types exempted from release due to SOR.

Furthermore, the user controlled list for SOR exemption may be a collection including information of one or more services exempted from release due to SOR. In other words, the user controlled list for SOR exemption may be a collection including one or more service types indicating services exempted from release due to SOR.

Furthermore, the user controlled list for SOR exemption may include information indicating one or more service types. Specifically, the user controlled list for SOR exemption may include MMTEL voice call, and/or MMTEL video call, and/or MO SMS over NAS (SMSoNAS), and/or MO SMSoIP.

More specifically, the user controlled list for SOR exemption may include information indicating whether the service of MMTEL voice call is exempted from release due to SOR. Furthermore, the user controlled list for SOR exemption may include information indicating whether the service of MMTEL video call is exempted from release due to SOR. Furthermore, the user controlled list for SOR exemption may include information indicating whether the service of MO SMS over NAS (SMSoNAS) or MO SMSoIP is exempted from release due to SOR.

In other words, the user controlled list for SOR exemption may include a first service. In yet other words, the user controlled list for SOR exemption may include a service type indicating the first service.

Conversely, the user controlled list for SOR exemption need not include the first service. In yet other words, the user controlled list for SOR exemption need not include the service type indicating the first service.

Here, the service type of the first service may be MMTEL voice call. Furthermore, the service type of the first service may be MMTEL video call. Furthermore, the service type of the first service may be MO SMS over NAS (SMSoNAS) or MO SMSoIP.

In other words, the first service may be the service of MMTEL voice call. Furthermore, the first service may be the service of MMTEL video call. Furthermore, the first service may be MO SMS over NAS (SMSoNAS) or MO SMSoIP.

Furthermore, the user controlled list for SOR exemption may be a list configured for the UE by the user of the UE. Furthermore, the user controlled list for SOR exemption may be a list provided for the UE from the HPLMN and/or the VPLMN. Furthermore, the user controlled list for SOR exemption may be a list configured for the UE by the HPLMN and/or the VPLMN. Furthermore, the user controlled list for SOR exemption may be a list in which configuration for the UE is limited by the HPLMN and/or the VPLMN.

Furthermore, the user controlled list for SOR exemption may be information configured for the UE by the user of the UE. Furthermore, the user controlled list for SOR exemption may be information provided for the UE from the HPLMN and/or the VPLMN. Furthermore, the user controlled list for SOR exemption may be information configured for the UE by the HPLMN and/or the VPLMN. Furthermore, the user controlled list for SOR exemption may be information of which configuration for the UE is limited by the HPLMN and/or the VPLMN.

Furthermore, the user controlled list for SOR exemption may be configured for the UE by the user of the UE. Furthermore, the user controlled list for SOR exemption may be provided for the UE from the HPLMN and/or the VPLMN. Furthermore, the user controlled list for SOR exemption may be configured for the UE by the HPLMN and/or the VPLMN.

Furthermore, the HPLMN and/or the VPLMN may configure the user controlled list for SOR exemption for the UE. More specifically, the HPLMN and/or the VPLMN may configure the user controlled list for SOR exemption for the UE at any timing. Furthermore, the HPLMN and/or the VPLMN may update the user controlled list for SOR exemption of the UE, or may re-configure the user controlled list for SOR exemption for the UE, at any timing.

Furthermore, the HPLMN and/or the VPLMN may transmit the user controlled list for SOR exemption to the UE, and thereby configure the user controlled list for SOR exemption for the UE. Furthermore, the HPLMN and/or the VPLMN may transmit the user controlled list for SOR exemption to the UE, and thereby update the user controlled list for SOR exemption of the UE, or re-configure the user controlled list for SOR exemption for the UE.

Furthermore, the HPLMN and/or the VPLMN may transmit 6th identification information to the UE, and thereby configure the user controlled list for SOR exemption for the UE. Furthermore, the HPLMN and/or the VPLMN may transmit the 6th identification information to the UE, and thereby update the user controlled list for SOR exemption of the UE, or re-configure the user controlled list for SOR exemption for the UE.

Furthermore, the HPLMN and/or the VPLMN may limit configuration of the user controlled list for SOR exemption for the UE. More specifically, the HPLMN and/or the VPLMN may limit configuration of the user controlled list for SOR exemption for the UE by the user of the UE.

Furthermore, the HPLMN and/or the VPLMN may limit or control the service types that can be configured for the user controlled list for SOR exemption by the user of the UE. Specifically, the HPLMN and/or the VPLMN may control whether the user of the UE can configure MMTEL voice call for the user controlled list for SOR exemption. Furthermore, the HPLMN and/or the VPLMN may control whether the user of the UE can configure MMTEL video call for the user controlled list for SOR exemption. Furthermore, the HPLMN and/or the VPLMN may control whether the user of the UE can configure MO SMS over NAS (SMSoNAS) or MO SMSoIP for the user controlled list for SOR exemption.

Furthermore, the HPLMN and/or the VPLMN may transmit information indicating the service types that can be configured for the user controlled list for SOR exemption to the UE, and thereby configure the information indicating the service types that can be configured for the user controlled list for SOR exemption for the UE. Furthermore, the HPLMN and/or the VPLMN may transmit the information indicating the service types that can be configured for the user controlled list for SOR exemption to the UE, and thereby update the information indicating the service types that can be configured for the user controlled list for SOR exemption of the UE, or re-configure the information indicating the service types that can be configured for the user controlled list for SOR exemption for the UE.

Furthermore, the HPLMN and/or the VPLMN may transmit the 6th identification information to the UE, and thereby configure the information indicating the service types that can be configured for the user controlled list for SOR exemption for the UE. Furthermore, the HPLMN and/or the VPLMN may transmit the 6th identification information to the UE, and thereby update the information indicating the service types that can be configured for the user controlled list for SOR exemption of the UE, or re-configure the information indicating the service types that can be configured for the user controlled list for SOR exemption for the UE.

Furthermore, the HPLMN and/or the VPLMN may add service types of the first service to the user controlled list for SOR exemption in a case of configuration of the user controlled list for SOR exemption. Conversely, the HPLMN and/or the VPLMN may delete service types of the first service from the user controlled list for SOR exemption in the case of configuration of the user controlled list for SOR exemption.

Furthermore, the HPLMN and/or the VPLMN may add service types of the first service to the user controlled list for SOR exemption in a case of update of the user controlled list for SOR exemption. Conversely, the HPLMN and/or the VPLMN may delete service types of the first service from the user controlled list for SOR exemption in the case of update of the user controlled list for SOR exemption.

Furthermore, the HPLMN and/or the VPLMN may add service types of the first service to the user controlled list for SOR exemption in a case of re-configuration of the user controlled list for SOR exemption. Conversely, the HPLMN and/or the VPLMN may delete service types of the first service from the user controlled list for SOR exemption in the case of re-configuration of the user controlled list for SOR exemption.

Furthermore, the HPLMN and/or the VPLMN may add service types of the first service to the information indicating the service types that can be configured for the user controlled list for SOR exemption in a case of configuration of the information indicating the service types that can be configured for the information indicating the service types that can be configured for the user controlled list for SOR exemption. Conversely, the HPLMN and/or the VPLMN may delete service types of the first service from the information indicating the service types that can be configured for the user controlled list for SOR exemption in a case of configuration of the information indicating the service types that can be configured for the user controlled list for SOR exemption.

Furthermore, the HPLMN and/or the VPLMN may add service types of the first service to the information indicating the service types that can be configured for the user controlled list for SOR exemption in a case of update of the information indicating the service types that can be configured for the user controlled list for SOR exemption. Conversely, the HPLMN and/or the VPLMN may delete service types of the first service from the information indicating the service types that can be configured for the user controlled list for SOR exemption in the case of update of the information indicating the service types that can be configured for the user controlled list for SOR exemption.

Furthermore, the HPLMN and/or the VPLMN may add service types of the first service to the information indicating the service types that can be configured for the user controlled list for SOR exemption in a case of re-configuration of the information indicating the service types that can be configured for the user controlled list for SOR exemption. Conversely, the HPLMN and/or the VPLMN may delete service types of the first service from the information indicating the service types that can be configured for the user controlled list for SOR exemption in the case of re-configuration of the information indicating the service types that can be configured for the user controlled list for SOR exemption.

Here, the service type of the first service may be MMTEL voice call. Furthermore, the service type of the first service may be MMTEL video call. Furthermore, the service type of the first service may be MO SMS over NAS (SMSoNAS) or MO SMSoIP.

In other words, the first service may be the service of MMTEL voice call. Furthermore, the first service may be the service of MMTEL video call. Furthermore, the first service may be MO SMS over NAS (SMSoNAS) or MO SMSoIP.

Furthermore, the HPLMN and/or the VPLMN may transmit the user controlled list for SOR exemption to the UE in a case of configuring the user controlled list for SOR exemption for the UE. Furthermore, the HPLMN and/or the VPLMN may transmit the user controlled list for SOR exemption to the UE in a case of updating the user controlled list for SOR exemption of the UE. Furthermore, the HPLMN and/or the VPLMN may transmit the user controlled list for SOR exemption to the UE in a case of re-configuring the user controlled list for SOR exemption for the UE.

Furthermore, the HPLMN and/or the VPLMN may transmit the 6th identification information to the UE in the case of configuring the user controlled list for SOR exemption for the UE. Furthermore, the HPLMN and/or the VPLMN may transmit the 6th identification information to the UE in the case of updating the user controlled list for SOR exemption of the UE. Furthermore, the HPLMN and/or the VPLMN may transmit the 6th identification information to the UE in the case of re-configuring the user controlled list for SOR exemption for the UE.

Furthermore, the HPLMN and/or the VPLMN may transmit the information indicating the service types that can be configured for the user controlled list for SOR exemption to the UE in a case of configuring the information indicating the service types that can be configured for the user controlled list for SOR exemption for the UE. Furthermore, the HPLMN and/or the VPLMN may transmit the information indicating the service types that can be configured for the user controlled list for SOR exemption to the UE in a case of updating the information indicating the service types that can be configured for the user controlled list for SOR exemption of the UE. Furthermore, the HPLMN and/or the VPLMN may transmit the information indicating the service types that can be configured for the user controlled list for SOR exemption to the UE in a case of re-configuring the information indicating the service types that can be configured for the user controlled list for SOR exemption for the UE.

Furthermore, the HPLMN and/or the VPLMN may transmit the 6th identification information to the UE in the case of configuring the information indicating the service types that can be configured for the user controlled list for SOR exemption for the UE. Furthermore, the HPLMN and/or the VPLMN may transmit the 6th identification information to the UE in the case of updating the information indicating the service types that can be configured for the user controlled list for SOR exemption of the UE. Furthermore, the HPLMN and/or the VPLMN may transmit the 6th identification information to the UE in the case of re-configuring the information indicating the service types that can be configured for the user controlled list for SOR exemption for the UE.

Furthermore, the HPLMN and/or the VPLMN may transmit the user controlled list for SOR exemption, using the N1 NAS signalling. More specifically, the HPLMN and/or the VPLMN may transmit the user controlled list for SOR exemption to the UE, using the N1 NAS signalling. In other words, the HPLMN and/or the VPLMN may transmit the user controlled list for SOR exemption to the UE, using the N1 NAS signalling, in order to configure the user controlled list for SOR exemption for the UE.

In other words, the HPLMN and/or the VPLMN may transmit the user controlled list for SOR exemption, via the N1 NAS signalling. More specifically, the HPLMN and/or the VPLMN may transmit the user controlled list for SOR exemption to the UE, via the N1 NAS signalling. In other words, the HPLMN and/or the VPLMN may transmit the user controlled list for SOR exemption to the UE, via the N1 NAS signalling, in order to configure the user controlled list for SOR exemption for the UE.

Furthermore, the HPLMN and/or the VPLMN may receive the user controlled list for SOR exemption, using the N1 NAS signalling. More specifically, the HPLMN and/or the VPLMN may receive the user controlled list for SOR exemption from the UE, using the N1 NAS signalling.

In other words, the HPLMN and/or the VPLMN may receive the user controlled list for SOR exemption, via the N1 NAS signalling. More specifically, the HPLMN and/or the VPLMN may receive the user controlled list for SOR exemption from the UE, via the N1 NAS signalling.

Here, the N1 NAS signalling may be a NAS message transmitted and/or received on the N1 interface. More specifically, the N1 NAS signalling may be an MM message or an SM message transmitted and/or received between the UE and the core network. Furthermore, the N1 NAS signalling may be a first message or a second message to be described later.

Furthermore, the user of the UE may configure the user controlled list for SOR exemption for the UE. More specifically, the user of the UE may configure the user controlled list for SOR exemption for the UE at any timing. Furthermore, the user of the UE may update the user controlled list for SOR exemption of the UE, or may re-configure the user controlled list for SOR exemption for the UE, at any timing.

Furthermore, the user of the UE may configure the user controlled list for SOR exemption for the UE, based on information received from the HPLMN and/or the VPLMN. More specifically, the user of the UE may configure the user controlled list for SOR exemption for the UE, based on the user controlled list for SOR exemption received by the UE from the HPLMN and/or the VPLMN. Furthermore, the user of the UE may update the user controlled list for SOR exemption of the UE, or may re-configure the user controlled list for SOR exemption for the UE, based on the user controlled list for SOR exemption received by the UE from the HPLMN and/or the VPLMN.

Furthermore, the user of the UE may configure the user controlled list for SOR exemption for the UE, based on the information indicating the service types that can be configured for the user controlled list for SOR exemption. More specifically, the user of the UE may configure the user controlled list for SOR exemption for the UE, based on the information indicating the service types that can be configured for the user controlled list for SOR exemption received by the UE from the HPLMN and/or the VPLMN. Furthermore, the user of the UE may update the user controlled list for SOR exemption of the UE, or may re-configure the user controlled list for SOR exemption for the UE, based on the information indicating the service types that can be configured for the user controlled list for SOR exemption received by the UE from the HPLMN and/or the VPLMN.

Furthermore, the user of the UE may configure the user controlled list for SOR exemption for the UE, based on the 6th identification information received by the UE from the HPLMN and/or the VPLMN. Furthermore, the user of the UE may update the user controlled list for SOR exemption of the UE, or may re-configure the user controlled list for SOR exemption for the UE, based on the 6th identification information received by the UE from the HPLMN and/or the VPLMN.

Furthermore, the user of the UE may configure the user controlled list for SOR exemption for the UE in a case that the UE receives the user controlled list for SOR exemption from the HPLMN and/or the VPLMN. Furthermore, the user of the UE may update the user controlled list for SOR exemption of the UE or may re-configure the user controlled list for SOR exemption for the UE in the case that the UE receives the user controlled list for SOR exemption from the HPLMN and/or the VPLMN.

Furthermore, the user of the UE may configure the user controlled list for SOR exemption for the UE in a case that the UE receives the information indicating the service types that can be configured for the user controlled list for SOR exemption from the HPLMN and/or the VPLMN. Furthermore, the user of the UE may update the user controlled list for SOR exemption of the UE or may re-configure the user controlled list for SOR exemption for the UE in the case that the UE receives the information indicating the service types that can be configured for the user controlled list for SOR exemption from the HPLMN and/or the VPLMN.

Furthermore, the user of the UE may configure the user controlled list for SOR exemption for the UE in a case that the UE receives the 6th identification information from the HPLMN and/or the VPLMN. Furthermore, the user of the UE may update the user controlled list for SOR exemption of the UE or may re-configure the user controlled list for SOR exemption for the UE in the case that the UE receives the 6th identification information from the HPLMN and/or the VPLMN.

Furthermore, the user of the UE may configure MMTEL voice call, and/or MMTEL video call, and/or MO SMS over NAS (SMSoNAS) or MO SMSoIP for the user controlled list for SOR exemption, or may configure the user controlled list for SOR exemption including MMTEL voice call, and/or MMTEL video call, and/or MO SMS over NAS (SMSoNAS) or MO SMSoIP for the UE.

More specifically, in a case that configuration of the service types is not limited, the user of the UE may configure MMTEL voice call, and/or MMTEL video call, and/or MO SMS over NAS (SMSoNAS) or MO SMSoIP for the user controlled list for SOR exemption, or may configure the user controlled list for SOR exemption including MMTEL voice call, and/or MMTEL video call, and/or MO SMS over NAS (SMSoNAS) or MO SMSoIP for the UE.

Furthermore, in a case that configuration of MMTEL voice call is limited, the user of the UE may configure MMTEL video call and/or MO SMS over NAS (SMSoNAS) or MO SMSoIP for the user controlled list for SOR exemption, or may configure the user controlled list for SOR exemption including MMTEL video call and/or MO SMS over NAS (SMSoNAS) or MO SMSoIP for the UE.

Furthermore, in a case that configuration of MMTEL video call is limited, the user of the UE may configure MMTEL voice call, and/or MO SMS over NAS (SMSoNAS) or MO SMSoIP for the user controlled list for SOR exemption, or may configure the user controlled list for SOR exemption including MMTEL voice call, and/or MO SMS over NAS (SMSoNAS) or MO SMSoIP for the UE.

Furthermore, in a case that configuration of MO SMS over NAS (SMSoNAS) or MO SMSoIP is limited, the user of the UE may configure MMTEL video call and/or MMTEL voice call for the user controlled list for SOR exemption, or may configure the user controlled list for SOR exemption including MMTEL video call and/or MMTEL voice call for the UE.

Furthermore, in a case that configuration of MMTEL voice call and MMTEL video call is limited, the user of the UE may configure MO SMS over NAS (SMSoNAS) or MO SMSoIP for the user controlled list for SOR exemption, or may configure the user controlled list for SOR exemption including MO SMS over NAS (SMSoNAS) or MO SMSoIP for the UE.

Furthermore, in a case that configuration of MMTEL voice call and MO SMS over NAS (SMSoNAS) or MO SMSoIP is limited, the user of the UE may configure MMTEL video call for the user controlled list for SOR exemption, or may configure the user controlled list for SOR exemption including MMTEL video call for the UE.

Furthermore, in a case that configuration of MMTEL video call and MO SMS over NAS (SMSoNAS) or MO SMSoIP is limited, the user of the UE may configure MMTEL voice call for the user controlled list for SOR exemption, or may configure the user controlled list for SOR exemption including MMTEL voice call for the UE.

Furthermore, in a case that configuration of MMTEL voice call, MMTEL video call, and MO SMS over NAS (SMSoNAS) or MO SMSoIP is limited, the user of the UE may configure an empty user controlled list for SOR exemption including no service types for the UE.

Furthermore, the user of the UE may add service types of the first service to the user controlled list for SOR exemption in the case of configuration of the user controlled list for SOR exemption. Conversely, the user of the UE may delete service types of the first service from the user controlled list for SOR exemption in the case of configuration of the user controlled list for SOR exemption.

Furthermore, the user of the UE may add service types of the first service to the user controlled list for SOR exemption in the case of update of the user controlled list for SOR exemption. Conversely, the user of the UE may delete service types of the first service from the user controlled list for SOR exemption in the case of update of the user controlled list for SOR exemption.

Furthermore, the user of the UE may add service types of the first service to the user controlled list for SOR exemption in the case of re-configuration of the user controlled list for SOR exemption. Conversely, the user of the UE may delete service types of the first service from the user controlled list for SOR exemption in the case of re-configuration of the user controlled list for SOR exemption.

Here, the service type of the first service may be MMTEL voice call. Furthermore, the service type of the first service may be MMTEL video call. Furthermore, the service type of the first service may be MO SMS over NAS (SMSoNAS) or MO SMSoIP.

In other words, the first service may be the service of MMTEL voice call. Furthermore, the first service may be the service of MMTEL video call. Furthermore, the first service may be MO SMS over NAS (SMSoNAS) or MO SMSoIP.

Furthermore, the UE may configure and/or store the user controlled list for SOR exemption. Furthermore, the UE may configure and/or store the user controlled list for SOR exemption together with the SOR-CMCI. More specifically, the UE may configure and/or store the user controlled list for SOR exemption together with the SOR-CMCI received.

Furthermore, the UE may configure and/or store the user controlled list for SOR exemption, based on information received from the HPLMN and/or the VPLMN. More specifically, the UE may configure and/or store the user controlled list for SOR exemption, based on the user controlled list for SOR exemption received from the HPLMN and/or the VPLMN. Furthermore, the UE may update the user controlled list for SOR exemption, or may re-configure the user controlled list for SOR exemption, based on the user controlled list for SOR exemption received from the HPLMN and/or the VPLMN.

Furthermore, the UE may configure and/or store the user controlled list for SOR exemption, based on the information indicating the service types that can be configured for the user controlled list for SOR exemption. More specifically, the UE may configure and/or store the user controlled list for SOR exemption, based on the information indicating the service types that can be configured for the user controlled list for SOR exemption received from the HPLMN and/or the VPLMN. Furthermore, the UE may update the user controlled list for SOR exemption, or may re-configure the user controlled list for SOR exemption, based on the information indicating the service types that can be configured for the user controlled list for SOR exemption received from the HPLMN and/or the VPLMN.

Furthermore, the UE may configure and/or store the user controlled list for SOR exemption, based on the 6th identification information received from the HPLMN and/or the VPLMN. Furthermore, the UE may update the user controlled list for SOR exemption, or may re-configure the user controlled list for SOR exemption, based on the 6th identification information received from the HPLMN and/or the VPLMN.

Furthermore, the UE may configure and/or store the user controlled list for SOR exemption, based on information configured by the user of the UE. More specifically, the UE may configure and/or store the user controlled list for SOR exemption, based on the user controlled list for SOR exemption configured by the user of the UE. Furthermore, the UE may update the user controlled list for SOR exemption, or may re-configure the user controlled list for SOR exemption, based on the user controlled list for SOR exemption configured by the user of the UE. Furthermore, the UE may update the user controlled list for SOR exemption, or may re-configure the user controlled list for SOR exemption, based on the user controlled list for SOR exemption re-configured by the user of the UE.

Furthermore, the UE may configure and/or store the information indicating the service types that can be configured for the user controlled list for SOR exemption, based on the information indicating the service types that can be configured for the user controlled list for SOR exemption. More specifically, the UE may configure and/or store the information indicating the service types that can be configured for the user controlled list for SOR exemption, based on the information indicating the service types that can be configured for the user controlled list for SOR exemption received from the HPLMN and/or the VPLMN. Furthermore, the UE may update the information indicating the service types that can be configured for the user controlled list for SOR exemption, or may re-configure the information indicating the service types that can be configured for the user controlled list for SOR exemption, based on the information indicating the service types that can be configured for the user controlled list for SOR exemption received from the HPLMN and/or the VPLMN.

Furthermore, the UE may configure and/or store the information indicating the service types that can be configured for the user controlled list for SOR exemption, based on the 6th identification information received from the HPLMN and/or the VPLMN. Furthermore, the UE may update the information indicating the service types that can be configured for the user controlled list for SOR exemption, or may re-configure the information indicating the service types that can be configured for the user controlled list for SOR exemption, based on the 6th identification information received from the HPLMN and/or the VPLMN.

Furthermore, the UE may configure and/or store the user controlled list for SOR exemption in a case of receiving the user controlled list for SOR exemption from the HPLMN and/or the VPLMN. Furthermore, the UE may update the user controlled list for SOR exemption or may re-configure the user controlled list for SOR exemption in the case of receiving the user controlled list for SOR exemption from the HPLMN and/or the VPLMN.

Furthermore, the UE may configure and/or store the user controlled list for SOR exemption in the case of receiving the information indicating the service types that can be configured for the user controlled list for SOR exemption from the HPLMN and/or the VPLMN. Furthermore, the UE may update the user controlled list for SOR exemption or may re-configure the user controlled list for SOR exemption in the case of receiving the information indicating the service types that can be configured for the user controlled list for SOR exemption from the HPLMN and/or the VPLMN.

Furthermore, the UE may configure and/or store the user controlled list for SOR exemption in the case of receiving the 6th identification information from the HPLMN and/or the VPLMN. Furthermore, the UE may update the user controlled list for SOR exemption or may re-configure the user controlled list for SOR exemption in the case of receiving the 6th identification information from the HPLMN and/or the VPLMN.

Furthermore, the UE may configure and/or store the user controlled list for SOR exemption in a case that the user of the UE configures the user controlled list for SOR exemption. Furthermore, the UE may update the user controlled list for SOR exemption or may re-configure the user controlled list for SOR exemption in the case that the user of the UE configures the user controlled list for SOR exemption. Furthermore, the UE may update the user controlled list for SOR exemption or may re-configure the user controlled list for SOR exemption in a case that the user of the UE re-configures the user controlled list for SOR exemption.

Furthermore, the UE may configure and/or store the information indicating the service types that can be configured for the user controlled list for SOR exemption in the case of receiving the information indicating the service types that can be configured for the user controlled list for SOR exemption from the HPLMN and/or the VPLMN. Furthermore, the UE may update the information indicating the service types that can be configured for the user controlled list for SOR exemption or may re-configure the information indicating the service types that can be configured for the user controlled list for SOR exemption in the case of receiving the information indicating the service types that can be configured for the user controlled list for SOR exemption from the HPLMN and/or the VPLMN.

Furthermore, the UE may configure and/or store the information indicating the service types that can be configured for the user controlled list for SOR exemption in the case of receiving the 6th identification information from the HPLMN and/or the VPLMN. Furthermore, the UE may update the information indicating the service types that can be configured for the user controlled list for SOR exemption or may re-configure the information indicating the service types that can be configured for the user controlled list for SOR exemption in the case of receiving the 6th identification information from the HPLMN and/or the VPLMN.

Furthermore, the UE may add service types of the first service to the user controlled list for SOR exemption in the case of configuration of the user controlled list for SOR exemption. Conversely, the UE may delete service types of the first service from the user controlled list for SOR exemption in the case of configuration of the user controlled list for SOR exemption.

Furthermore, the UE may add service types of the first service to the user controlled list for SOR exemption in the case of update of the user controlled list for SOR exemption. Conversely, the UE may delete service types of the first service from the user controlled list for SOR exemption in the case of update of the user controlled list for SOR exemption.

Furthermore, the UE may add service types of the first service to the user controlled list for SOR exemption in the case of re-configuration of the user controlled list for SOR exemption. Conversely, the UE may delete service types of the first service from the user controlled list for SOR exemption in the case of re-configuration of the user controlled list for SOR exemption.

Furthermore, the UE may add service types of the first service to the information indicating the service types that can be configured for the user controlled list for SOR exemption in the case of configuration of the information indicating the service types that can be configured for the information indicating the service types that can be configured for the user controlled list for SOR exemption. Conversely, the UE may delete service types of the first service from the information indicating the service types that can be configured for the user controlled list for SOR exemption in the case of configuration of the information indicating the service types that can be configured for the user controlled list for SOR exemption.

Furthermore, the UE may add service types of the first service to the information indicating the service types that can be configured for the user controlled list for SOR exemption in the case of update of the information indicating the service types that can be configured for the user controlled list for SOR exemption. Conversely, the UE may delete service types of the first service from the information indicating the service types that can be configured for the user controlled list for SOR exemption in the case of update of the information indicating the service types that can be configured for the user controlled list for SOR exemption.

Furthermore, the UE may add service types of the first service to the information indicating the service types that can be configured for the user controlled list for SOR exemption in the case of re-configuration of the information indicating the service types that can be configured for the user controlled list for SOR exemption. Conversely, the UE may delete service types of the first service from the information indicating the service types that can be configured for the user controlled list for SOR exemption in the case of re-configuration of the information indicating the service types that can be configured for the user controlled list for SOR exemption.

Here, the service type of the first service may be MMTEL voice call. Furthermore, the service type of the first service may be MMTEL video call. Furthermore, the service type of the first service may be MO SMS over NAS (SMSoNAS) or MO SMSoIP.

In other words, the first service may be the service of MMTEL voice call. Furthermore, the first service may be the service of MMTEL video call. Furthermore, the first service may be MO SMS over NAS (SMSoNAS) or MO SMSoIP.

Furthermore, the UE may transmit the user controlled list for SOR exemption to the HPLMN and/or the VPLMN in a case of configuring the user controlled list for SOR exemption. Furthermore, the UE may transmit the user controlled list for SOR exemption to the HPLMN and/or the VPLMN in a case of updating the user controlled list for SOR exemption. Furthermore, the UE may transmit the user controlled list for SOR exemption to the HPLMN and/or the VPLMN in a case of re-configuring the user controlled list for SOR exemption.

Furthermore, the UE may transmit 12th identification information to the HPLMN and/or the VPLMN in the case of configuring the user controlled list for SOR exemption. Furthermore, the UE may transmit the 12th identification information to the HPLMN and/or the VPLMN in the case of updating the user controlled list for SOR exemption. Furthermore, the UE may transmit the 12th identification information to the HPLMN and/or the VPLMN in the case of re-configuring the user controlled list for SOR exemption.

Furthermore, the UE may transmit the information indicating the service types that can be configured for the user controlled list for SOR exemption to the HPLMN and/or the VPLMN in a case of configuring the information indicating the service types that can be configured for the user controlled list for SOR exemption. Furthermore, the UE may transmit the information indicating the service types that can be configured for the user controlled list for SOR exemption to the HPLMN and/or the VPLMN in a case of updating the information indicating the service types that can be configured for the user controlled list for SOR exemption. Furthermore, the UE may transmit the information indicating the service types that can be configured for the user controlled list for SOR exemption to the HPLMN and/or the VPLMN in a case of re-configuring the information indicating the service types that can be configured for the user controlled list for SOR exemption.

Furthermore, the UE may transmit the 12th identification information to the HPLMN and/or the VPLMN in the case of configuring the information indicating the service types that can be configured for the user controlled list for SOR exemption. Furthermore, the UE may transmit the 12th identification information to the HPLMN and/or the VPLMN in the case of updating the information indicating the service types that can be configured for the user controlled list for SOR exemption. Furthermore, the UE may transmit the 12th identification information to the HPLMN and/or the VPLMN in the case of re-configuring the information indicating the service types that can be configured for the user controlled list for SOR exemption.

Furthermore, the UE may receive the user controlled list for SOR exemption, using the N1 NAS signalling. More specifically, the UE may receive the user controlled list for SOR exemption from the HPLMN and/or the VPLMN, using the N1 NAS signalling.

In other words, the UE may receive the user controlled list for SOR exemption, via the N1 NAS signalling. More specifically, the UE may receive the user controlled list for SOR exemption from the HPLMN and/or the VPLMN, via the N1 NAS signalling.

Furthermore, the UE may transmit the user controlled list for SOR exemption, using the N1 NAS signalling. More specifically, the UE may transmit the user controlled list for SOR exemption to the HPLMN and/or the VPLMN, using the N1 NAS signalling. In other words, the UE may transmit the user controlled list for SOR exemption to the HPLMN and/or the VPLMN, using the N1 NAS signalling, in order to notify the HPLMN and/or the VPLMN of the user controlled list for SOR exemption.

Furthermore, the UE may transmit the user controlled list for SOR exemption, via the N1 NAS signalling. More specifically, the UE may transmit the user controlled list for SOR exemption to the HPLMN and/or the VPLMN, via the N1 NAS signalling. In other words, the UE may transmit the user controlled list for SOR exemption to the HPLMN and/or the VPLMN, via the N1 NAS signalling, in order to notify the HPLMN and/or the VPLMN of the user controlled list for SOR exemption.

Here, the N1 NAS signalling may be a NAS message transmitted and/or received on the N1 interface. More specifically, the N1 NAS signalling may be an MM message or an SM message transmitted and/or received between the UE and the core network. Furthermore, the N1 NAS signalling may be a first message or a second message to be described later.

2.7. Description of Identification Information in Present Embodiment

1st identification information is Steering of roaming connected mode control information (SOR-CMCI). Here, the SOR-CMCI may be information of the Home PLMN (HPLMN) for controlling timing of transitioning the UE in the connected mode to the idle mode in order to perform steering of roaming (SoR). Furthermore, the SOR-CMCI may include one or more of at least one or more pieces of identification information out of 2nd to 5th pieces of identification information. In other words, the 1st identification information may include one or more pieces of the 2nd identification information, and/or one or more pieces of the 3rd identification information, and/or one or more pieces of the 4th identification information, and/or one or more pieces of the 5th identification information.

Furthermore, the 1st identification information may be the SOR-CMCI created by the HPLMN and/or the Visited PLMN (VPLMN). Furthermore, the 1st identification information may be the SOR-CMCI configured for the UE by the HPLMN and/or the VPLMN.

Furthermore, the 1st identification information may be information selected and determined by the HPLMN and/or the VPLMN. More specifically, the 1st identification information may be information selected and determined based on capability information of the network, and/or an operator policy, and/or a state of the network, and/or registration information of the user, and/or the like.

The 2nd identification information is information indicating criteria or a criterion included in the SOR-CMCI. The 2nd identification information may be referred to as a criterion, criterion information, criteria, criteria information, criteria/criterion, criteria/criterion information, or the like.

The 2nd identification information may be value(s) of S-NSSAI(s), and/or value(s) of DNN(s), and/or 5QI(s), and/or information indicating service type(s), and/or information indicating matching of all types of criteria. Value(s) indicating combination(s) of the S-NSSAI(s) and the DNN(s) may include the value(s) of the DNN(s) and the value(s) of the S-NSSAI(s).

Furthermore, the 2nd identification information may include information indicating access technology(ies), and/or information indicating PDU session type(s), and/or value(s) of PDU session ID(s).

The 2nd identification information may be value(s) of one or more S-NSSAIs, and/or value(s) of one or more DNNs, and/or one or more 5QIs, and/or information indicating one or more service types, or may include these. The 2nd identification information may be information indicating one or more access technologies, and/or information indicating one or more PDU session types, and/or value(s) of one or more PDU session IDs, or may include these. In a case that the 2nd identification information includes a value of an S-NSSAI, the S-NSSAI may be the mapped S-NSSAI in a case that the UE roams, or may be the S-NSSAI of the current PLMN in a case that the UE does not roam. Alternatively, in the case that the 2nd identification information includes a value of an S-NSSAI, the S-NSSAI may be the S-NSSAI of the current PLMN. Alternatively, in the case that the 2nd identification information includes a value of an S-NSSAI, the S-NSSAI may include a value of the S-NSSAI of the current PLMN and a value of the mapped S-NSSAI in the case that the UE roams, or may be the S-NSSAI of the current PLMN in the case that the UE does not roam.

Here, service type(s) indicated by the information indicating service type(s) may include IMS registration related signalling, and/or MMTEL voice call, and/or MMTEL video call, and/or MO SMS over NAS, and/or MO SMSoIP, or may be information indicating other service(s).

For example, in a case that the 2nd identification information is the information indicating service type(s), the 2nd identification information may indicate a 5GC-Mobile Originated-Location Request (MO-LR) procedure, and/or a UE triggered V2X policy provisioning procedure, and/or CIoT user data transfer over the control plane.

The 2nd identification information may be a value of a type indicated by the 4th identification information. Specifically, in a case that the 4th identification information is information indicating a DNN, the 2nd identification information may be a value of the DNN. In a case that the 4th identification information is information indicating an S-NSSAI, the 2nd identification information may be a value of the S-NSSAI. In a case that the 4th identification information is information indicating a 5QI, the 2nd identification information may be a value of the 5QI.

In a case that the 4th identification information indicates information indicating an access technology, the 2nd identification information may be information indicating the access technology. In a case that the 4th identification information indicates information indicating a PDU session type, the 2nd identification information may be information indicating the PDU session type. In a case that the 4th identification information is information indicating a PDU session ID, the 2nd identification information may be a value of the PDU session ID.

For example, in a case that the 2nd identification information is the information indicating matching of all types of criteria, each apparatus may apply a timer value indicated by the 3rd identification information associated with the 2nd identification information, regardless of information (for example, value(s) of S-NSSAI(s), or value(s) of DNN(s), or value(s) of 5QI(s)) associated with PDU session(s) being established or type(s) of service(s) being performed.

Each piece of information described as the 2nd identification information may be notified from the NW to the UE as an independent piece of information. Specifically, the value(s) of the S-NSSAI(s), or the value(s) of the DNN(s), or the value(s) of the 5QI(s), or the value(s) indicating combination(s) of the S-NSSAI(s) and the DNN(s), each of which is a criterion value indicating an attribute of a PDU session, the information indicating service(s), and the information indicating matching of all types of criteria may be notified as different pieces of information.

The 3rd identification information is a timer value indicating timing of initiating SOR, and may be associated with the 2nd identification information. The 3rd identification information may be a timer value to be set to the first timer. A value included in the 3rd identification information may be a value of 0 or greater. The 3rd identification information may indicate Infinity.

The timer value included in the 3rd identification information may be a value associated with the criteria/criterion included in the 2nd identification information.

In a case that PDU session(s) is being established or service(s) is being performed that matches the criteria/criterion indicated by the 2nd identification information, the timer value indicated by the 3rd identification information may be selected and/or applied.

The 3rd identification information may include multiple timer values. The 3rd identification information may include individual timer values respectively associated with the one or more DNNs, and/or the one or more S-NSSAIs, and/or the one or more 5QIs, and/or the information indicating the one or more access technologies, and/or the information indicating the one or more PDU session types, and/or the value(s) of the one or more PDU session IDs, and/or the information indicating the one or more service types, which is/are included in the 2nd identification information.

Furthermore, the 3rd identification information may be the first timer value.

The 4th identification information is information indicating a type of information indicated by the 2nd identification information, and may be associated with the 2nd identification information. For example, in a case that the 2nd identification information is a value of an S-NSSAI, the 4th identification information may be information indicating the S-NSSAI. For example, in a case that the 2nd identification information is a value of a DNN, the 4th identification information may be information indicating the DNN. For example, in a case that the 2nd identification information is a value of a 5QI, the 4th identification information may be information indicating the 5QI.

In a case that the 2nd identification information is information indicating an access technology, the 4th identification information may indicate information indicating the access technology. In a case that the 2nd identification information is information indicating a PDU session type, the 4th identification information may indicate information indicating the PDU session type. In a case that the 2nd identification information is a value of a PDU session ID, the 4th identification information may be information indicating the PDU session ID.

The 4th identification information may be transmitted and/or received in a case that the 2nd identification information is criteria/criterion belonging to the PDU session(s). In other words, the 4th identification information may be transmitted and/or received except for a case that the 2nd identification information is information indicating matching of the criteria/criterion indicating the service type(s) and/or all the types of criteria.

In a case that the 2nd identification information is the information indicating the service type(s), the 4th identification information may be information indicating that the 2nd identification information is the information indicating the service type(s). Alternatively, in the case that the 2nd identification information is the information indicating the service type(s), the 4th identification information need not be transmitted and/or received.

In a case that the 2nd identification information is the information indicating matching of all the types of criteria, the 4th identification information may be information indicating that the 2nd identification information matches all the types of criteria. Alternatively, in the case that the 2nd identification information is the information indicating matching of all the types of criteria, the 4th identification information need not be transmitted and/or received.

Furthermore, the 4th identification information may be information indicating a type of the 2nd identification information.

The 5th identification information is information indicating priority of the 2nd identification information. The information indicating priority may be expressed by the precedence value, and for example, a low numerical value of the precedence value may mean a high priority. The NW may arrange that the same priority does not belong to multiple criteria, or may allow the same priority to belong to multiple criteria.

The 6th identification information is the user controlled list for SOR exemption. The 6th identification information may be the user controlled list of services exempted from release due to SOR.

Furthermore, the 6th identification information may be the user controlled list for SOR exemption created by the Home PLMN (HPLMN) and/or the Visited PLMN (VPLMN).

Furthermore, the 6th identification information may be the user controlled list for SOR exemption configured for the UE by the HPLMN and/or the VPLMN.

Furthermore, the 6th identification information may be the user controlled list for SOR exemption controlled by the HPLMN and/or the VPLMN. Furthermore, the 6th identification information may be the user controlled list for SOR exemption of which configuration for the UE is limited by the HPLMN and/or the VPLMN. Furthermore, the 6th identification information may be the user controlled list for SOR exemption of which configuration by the user of the UE is partially limited by the HPLMN and/or the VPLMN.

Furthermore, the 6th identification information may be the user controlled list for SOR exemption including the information indicating one or more service types. Specifically, the 6th identification information may be the user controlled list for SOR exemption including MMTEL voice call, and/or MMTEL video call, and/or MO SMS over NAS (SMSoNAS), and/or MO SMSoIP.

More specifically, the 6th identification information may include information indicating whether the service of MMTEL voice call is exempted from release due to SOR. Furthermore, the 6th identification information may include information indicating whether the service of MMTEL video call is exempted from release due to SOR. Furthermore, the 6th identification information may include information indicating whether the service of MO SMS over NAS (SMSoNAS) or MO SMSoIP is exempted from release due to SOR.

Furthermore, the 6th identification information may be information selected and determined by the HPLMN and/or the VPLMN. More specifically, the 6th identification information may be information selected and determined based on capability information of the network, and/or an operator policy, and/or a state of the network, and/or registration information of the user, and/or the like.

11th identification information is the Steering of roaming connected mode control information (SOR-CMCI). Here, the SOR-CMCI may be information of the Home PLMN (HPLMN) for controlling timing of transitioning the UE in the connected mode to the idle mode in order to perform steering of roaming (SoR). Furthermore, the SOR-CMCI may include one or more of at least one or more pieces of identification information out of the 2nd to 5th pieces of identification information. In other words, the 11th identification information may include one or more pieces of the 2nd identification information, and/or one or more pieces of the 3rd identification information, and/or one or more pieces of the 4th identification information, and/or one or more pieces of the 5th identification information.

Furthermore, the 11th identification information may be the SOR-CMCI adapted to the UE. Furthermore, the 11th identification information may be the SOR-CMCI configured for the UE.

Furthermore, the 11th identification information may be information selected and determined by the UE. More specifically, the 11th identification information may be information selected and determined based on identification information received by the UE, and/or configuration of the UE, and/or a state of the UE, and/or a user policy, and/or a request of an application.

Furthermore, the 11th identification information may be information selected and determined based on service(s) performed on the UE, and/or PDU session(s) established by the UE, and/or type(s) of the PDU session(s) established by the UE.

The 12th identification information is the user controlled list for SOR exemption. The 12th identification information may be the user controlled list of services exempted from release due to SOR.

Furthermore, the 12th identification information may be the user controlled list for SOR exemption adapted to the UE. Furthermore, the 12th identification information may be the user controlled list for SOR exemption configured for the UE. Furthermore, the 12th identification information may be the user controlled list for SOR exemption updated by the user of the UE, or may be the user controlled list for SOR exemption re-configured for the UE.

Furthermore, the 12th identification information may be the user controlled list for SOR exemption including the information indicating one or more service types. Specifically, the 12th identification information may be the user controlled list for SOR exemption including MMTEL voice call, and/or MMTEL video call, and/or MO SMS over NAS (SMSoNAS), and/or MO SMSoIP.

More specifically, the 12th identification information may include information indicating whether the service of MMTEL voice call is exempted from release due to SOR. Furthermore, the 12th identification information may include information indicating whether the service of MMTEL video call is exempted from release due to SOR. Furthermore, the 12th identification information may include information indicating whether the service of MO SMS over NAS (SMSoNAS) or MO SMSoIP is exempted from release due to SOR.

Furthermore, the 12th identification information may be information selected and determined by the UE. More specifically, the 12th identification information may be information selected and determined based on identification information received by the UE, and/or configuration of the UE, and/or a state of the UE, and/or a user policy, and/or a request of an application.

Furthermore, the 12th identification information may be information selected and determined based on service(s) performed on the UE, and/or PDU session(s) established by the UE, and/or type(s) of the PDU session(s) established by the UE.

3. Embodiments in Present Invention

Embodiments of the present invention include an example of a behavior in which the NW configures timing at which the UE transitions from the connected mode to the idle mode and a behavior in which the UE transitions from the connected mode to the idle mode based on the configuration. Note that the term "UE_A 10" may mean the UE. Conversely, the UE may be referred to as the UE_A 10.

A specific example of the embodiments of the present invention will be described below.

3.1. First Embodiment

Figure 6:
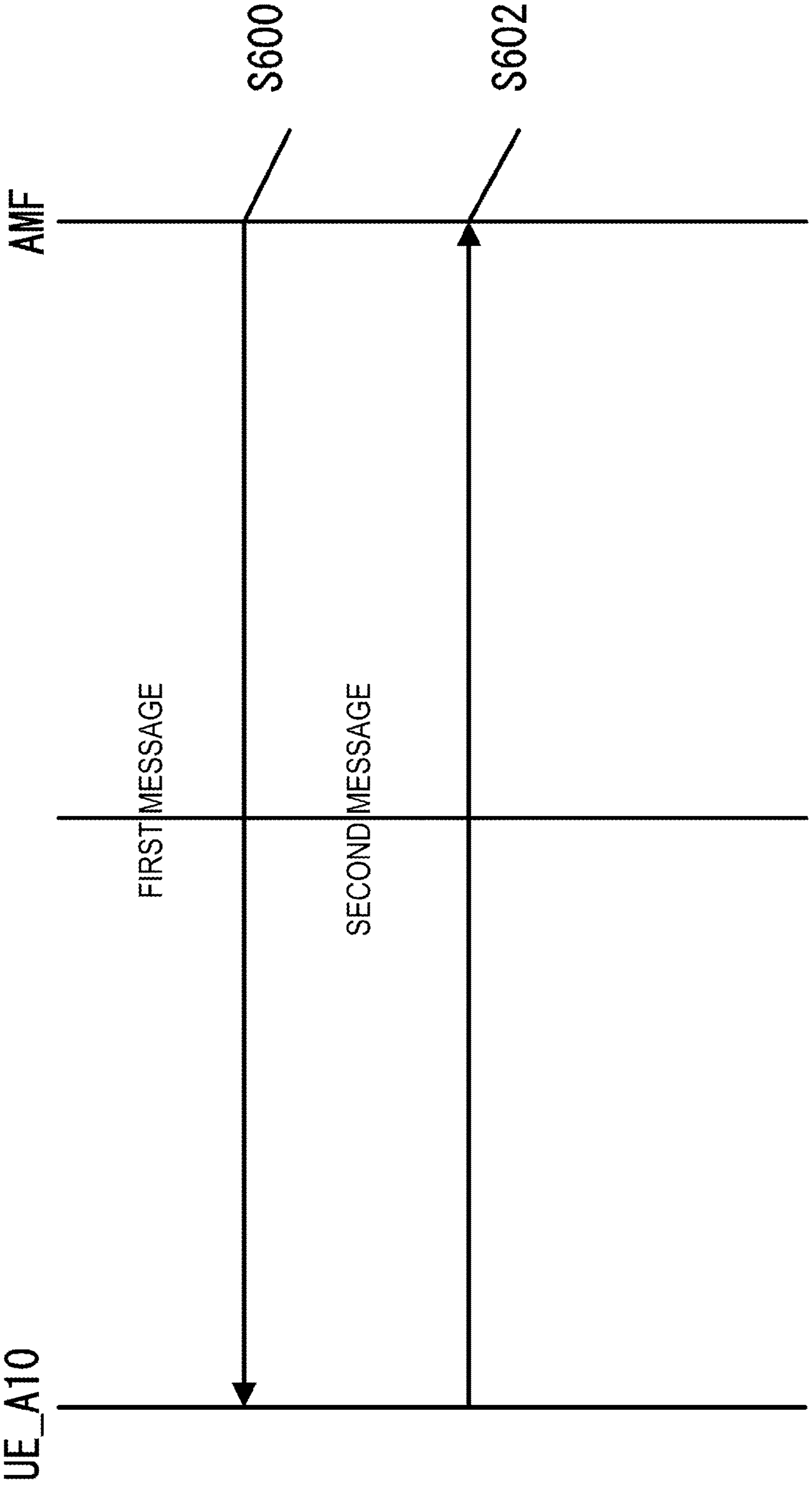
FIG. 6 is a diagram illustrating a procedure for notification of SOR-CMCI.

With reference to FIG. 6, the following will describe an embodiment for the NW to notify the UE_A 10 of the SOR-CMCI in order that the NW configures the timing at which the UE_A 10 transitions from the connected mode to the idle mode.

A procedure in which the NW notifies the UE_A 10 of information indicating the timing at which the UE_A 10 transitions from the connected mode to the idle mode may be the MM procedure, and is hereinafter referred to as the present procedure. Note that the present procedure may be included in the MM procedure.

For example, in a case that the present procedure is included in the Registration procedure, the first message (S600) may be the registration accept message, and the second message (S602) may be the registration complete message. The registration procedure may be the initial registration procedure, or may be the mobility and periodic registration procedure.

For example, in a case that the present procedure is included in the Generic UE configuration update procedure, the first message (S600) may be the CONFIGURATION UPDATE COMMAND message, and the second message (S602) may be the CONFIGURATION UPDATE COMPLETE message.

In other words, in a case that the present procedure is implemented in the Generic UE configuration update procedure, the first message (S600) may be the CONFIGURATION UPDATE COMMAND message, and the second message (S602) may be the CONFIGURATION UPDATE COMPLETE message.

For example, in a case that the present procedure is implemented in the NAS transport procedure, the first message (S600) may be the downlink NAS transport message (DL NAS TRANSPORT message) in the NW-initiated NAS transport procedure (Network-initiated NAS transport procedure), and the second message (S602) may be the uplink NAS transport message (UL NAS TRANSPORT message) in the UE_A 10-initiated NAS transport procedure (UE-initiated NAS transport procedure).

In other words, in the case that the present procedure is implemented in the NAS transport procedure, the first message (S600) may be the DL NAS transport message (Downlink NAS TRANSPORT message), and the second message (S602) may be the UL NAS transport message (Uplink NAS TRANSPORT message).

Regardless of the above description, the first message and/or the second message may be the NAS MM message.

Furthermore, the first message and/or the second message may be the NAS message.

The AMF 140 transmits the first message to the UE_A 10 (S600). The AMF 140 can include at least one of one or more pieces of identification information out of the 1st to 5th pieces of identification information in the first message to transmit thereof. In a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Furthermore, the AMF 140 may include the 6th identification information in the first message. Note that the 6th identification information may be included in the first message together with one or more pieces of identification information out of the 1st to 5th pieces of identification information. Conversely, the 6th identification information may be included in the first message separately from the 1st to 5th pieces of identification information.

Here, in a case that the 6th identification information is included in the first message together with one or more pieces of identification information out of the 1st to 5th pieces of identification information, two or more pieces of identification information of these pieces of identification information may be configured as one or more pieces of identification information. Furthermore, in a case that the 6th identification information is transmitted and/or received together with one or more pieces of identification information out of the 1st to 5th pieces of identification information, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

The AMF 140 may determine transmission of the first message and information to be included in the first message, based on information received from the UE_A 10.

Specifically, in a case that the UE_A 10 transmits a control message (for example, a registration request message) including function information (Capability) indicating support of a SOR-CMCI function to the AMF 140, the AMF 140 may include one or more pieces of identification information out of the 1st to 5th pieces of identification information in the first message to transmit thereof to the UE_A 10, based on a fact that the AMF 140 has received the function information indicating support of the SOR-CMCI function from the UE_A 10, and/or based on a fact that the UE_A 10 supports the SOR-CMCI function. Note that the 1st identification information may include one or more of at least one piece of identification information out of the 2nd to 5th pieces of identification information. In other words, the first message may include the 1st identification information, and/or one or more pieces of the 2nd identification information, and/or one or more pieces of the 3rd identification information, and/or one or more pieces of the 4th identification information, and/or one or more pieces of the 5th identification information.

Furthermore, in the case that the UE_A 10 transmits the control message (for example, the registration request message) including the function information (Capability) indicating support of the SOR-CMCI function to the AMF 140, the AMF 140 may include the 6th identification information in the first message to transmit thereof to the UE_A 10, based on a fact that the AMF 140 has received the function information indicating support of the SOR-CMCI function from the UE_A 10, and/or based on a fact that the UE_A 10 supports the SOR-CMCI function. Note that the 6th identification information may be included in the first message by being included in the 1st identification information. Conversely, the 6th identification information may be included in the first message without being included in the 1st identification information. In this case, the 6th identification information and the 1st identification information may both be included in the first message.

The AMF 140 may include other identification information in the first message. For example, the AMF 140 may include the SOR transport container information element (SOR transparent container IE) in the first message. One or more of at least one piece of information out of the 1st to 5th pieces of identification information may be included in the SOR transport container information element so that transmission thereof may be performed.

Furthermore, the AMF 140 may include the 6th identification information in the SOR transport container information element. In other words, the AMF 140 may include the SOR transport container information element including the 6th identification information in the first message.

Furthermore, the AMF 140 may include the 6th identification information in the SOR transport container information element together with the 1st identification information. In other words, the AMF 140 may include the SOR transport container information element including the 1st identification information and the 6th identification information in the first message.

In yet other words, the 6th identification information may be included in the SOR transport container information element together with the 1st identification information. Furthermore, the SOR transport container information element including the 1st identification information and the 6th identification information may be included in the first message.

The SOR transport container information element included in the first message may include the SOR information, may include the list of combinations of recommended (or prioritized) PLMNs and access technologies and it (the list), or may include the secured packets. In that case, the SOR transport container information element may further include information indicating that the SOR information is included in the SOR transport container information element.

The SOR transport container information element included in the first message may include information indicating whether an acknowledgement (ACK) is to be requested. In other words, the SOR transport container information element may include information indicating that the ACK is to be requested, or may include information indicating that the ACK is not to be requested.

In a case that the SOR transport container information element includes one or more of at least one piece of information out of the 1st to 5th pieces of identification information, information indicating that the SOR transport container information element includes the SOR-CMCI may be included.

Furthermore, in a case that the SOR transport container information element includes the 6th identification information, information indicating that the SOR transport container information element includes the user controlled list for SOR exemption may be included.

Next, the UE_A 10 receives the first message (S600). More specifically, the UE_A 10 receives the first message transmitted by the AMF 140.

In a case that the UE_A 10 receives the 1st identification information, the UE_A 10 may store the received SOR-CMCI. More specifically, the UE_A 10 may store the received SOR-CMCI in a non-volatile memory or a Universal Subscriber Identity Module (USIM).

In the case that the UE_A 10 receives the 1st identification information, the UE_A 10 may configure the received SOR-CMCI for the UE. Furthermore, the UE_A 10 may store the configured SOR-CMCI. More specifically, the UE_A 10 may store the configured SOR-CMCI in the non-volatile memory or the USIM.

Furthermore, in the case that the UE_A 10 receives the 1st identification information, the UE_A 10 may update its stored SOR-CMCI to the new SOR-CMCI that has been received. In other words, based on reception of the 1st identification information, the UE_A 10 storing the SOR-CMCI may delete information included in the old SOR-CMCI or the old SOR-CMCI, and store the new SOR-CMCI.

Furthermore, in a case that the UE_A 10 receives the 1st identification information including the new SOR-CMCI, the UE_A 10 may update the stored old SOR-CMCI to the new SOR-CMCI that has been received. In other words, in the case that the UE_A 10 receives the 1st identification information including the new SOR-CMCI, the UE_A 10 may delete the old SOR-CMCI, and store the new SOR-CMCI.

The UE_A 10 may store the stored SOR-CMCI and/or information included in the SOR-CMCI, until the UE_A 10 receives new SOR-CMCI next, or until power of the UE is turned off, or until the Universal Subscriber Identity Module (USIM) is removed.

In other words, in a case that a new USIM is inserted, the UE_A 10 may delete the stored SOR-CMCI and/or information included in the SOR-CMCI. Conversely, in a case that power of the UE is turned off, the UE_A 10 need not delete and may continue holding the stored SOR-CMCI and/or information included in the SOR-CMCI.

Furthermore, in a case that the UE_A 10 receives the 1st identification information while the first timer is running, the UE_A 10 may check whether the criteria/criterion matching the PDU session(s) and/or the service(s) being performed is included in the received SOR-CMCI.

Note that, in a case that the criteria/criterion matching the PDU session(s) and/or the service(s) being performed is included in the received SOR-CMCI, the UE_A 10 may update the value of the first timer to a value included in the received SOR-CMCI, without stopping and/or restarting the first timer. In other words, in the case that the criteria/criterion matching the PDU session(s) and/or the service(s) being performed is included in the received SOR-CMCI, the value of the first timer may be replaced with the value included in the received SOR-CMCI, without being stopped and/or restarted.

More specifically, in a case that the value included in the received SOR-CMCI is infinity, the UE_A 10 may configure infinity to the value of the first timer associated with the PDU session(s) and/or the service(s). In other words, in the case that the value included in the received SOR-CMCI is infinity, the value of the first timer associated with the PDU session(s) and/or the service(s) may be configured to infinity.

Furthermore, in a case that the value included in the received SOR-CMCI is smaller than the current value of the running first timer associated with the service(s), the UE_A 10 may update the value of the first timer associated with the PDU session(s) and/or the service(s) to the value included in the received SOR-CMCI, without stopping and/or restarting the first timer. In other words, in the case that the value included in the received SOR-CMCI is smaller than the current value of the running first timer associated with the service(s), the value of the first timer associated with the PDU session(s) and/or the service(s) may be replaced with the value included in the received SOR-CMCI, without being stopped and/or restarted.

Furthermore, in a case that the UE_A 10 stores the user controlled list for SOR exemption, and the criteria/criterion matching the service(s) being performed is included in the user controlled list for SOR exemption, the UE_A 10 may configure infinity to the value of the first timer associated with the service(s). In other words, in the case that the UE_A 10 stores the user controlled list for SOR exemption, and the criteria/criterion matching the service(s) being performed is included in the user controlled list for SOR exemption, the value of the first timer associated with the service(s) may be configured to infinity.

Furthermore, in other cases not applying to the above condition, the UE_A 10 may maintain a state of the first timer associated with the PDU session(s) and/or the service(s) without changing the state. In other words, in other cases not applying to the above condition, the first timer associated with the PDU session(s) and/or the service(s) may be maintained with the state not being changed.

Conversely, the UE_A 10 that has received the 1st identification information while the first timer is running may stop the first timer, based on reception of new the SOR-CMCI. In other words, in a case that the UE_A 10 selects a new first timer value while the first timer is running, the UE_A 10 may stop the running first timer.

Furthermore, the UE_A 10 that has received the 1st identification information while the first timer is running may stop the first timer based on reception of the new SOR-CMCI, set the first timer value based on the new SOR-CMCI, and start it.

In other words, in the case that the UE_A 10 selects a new first timer value while the first timer is running, the UE_A 10 may stop the running first timer and start the first timer with the new first timer value being set.

Alternatively, even in a case that the UE_A 10 that has received the 1st identification information while the first timer is running receives the new SOR-CMCI, the UE_A 10 may continue counting without stopping the running first timer. In that case, the UE_A 10 may update from the stored old SOR-CMCI to the new SOR-CMCI, based on expiration or stop of the first timer. In other words, the UE_A 10 that has received the 1st identification information while the first timer is running may update from the stored old SOR-CMCI to the new SOR-CMCI included in the 1st identification information after stop or expiration of the first timer.

In a case that the UE_A 10 receives the 6th identification information, the UE_A 10 may store the received user controlled list for SOR exemption. More specifically, the UE_A 10 may store the received user controlled list for SOR exemption in the non-volatile memory or the USIM.

In a case that the UE_A 10 receives the 6th identification information, the UE_A 10 may configure the received user controlled list for SOR exemption for the UE. Furthermore, the UE_A 10 may store the configured user controlled list for SOR exemption. More specifically, the UE_A 10 may store the configured user controlled list for SOR exemption in the non-volatile memory or the USIM.

Furthermore, in a case that the UE_A 10 receives the 6th identification information, the UE_A 10 may update the stored user controlled list for SOR exemption to the new user controlled list for SOR exemption that has been received. In other words, the UE_A 10 storing the user controlled list for SOR exemption may delete information included in the old user controlled list for SOR exemption or the old user controlled list for SOR exemption, and store the new user controlled list for SOR exemption, based on reception of the 6th identification information.

Furthermore, in a case that the UE_A 10 receives the 6th identification information, the UE_A 10 may update the configured user controlled list for SOR exemption to the received user controlled list for SOR exemption. In other words, the UE_A 10 that has configured the user controlled list for SOR exemption may delete information included in the old user controlled list for SOR exemption or the old user controlled list for SOR exemption, and may store the new user controlled list for SOR exemption, based on reception of the 6th identification information.

Furthermore, in a case that the UE_A 10 receives the 6th identification information including the new user controlled list for SOR exemption, the UE_A 10 may update the stored old user controlled list for SOR exemption to the new user controlled list for SOR exemption that has been received. In other words, in the case that the UE_A 10 receives the 6th identification information including the new user controlled list for SOR exemption, the UE_A 10 may delete the old user controlled list for SOR exemption, and store the new user controlled list for SOR exemption.

Furthermore, in the case that the UE_A 10 receives the 6th identification information including the new user controlled list for SOR exemption, the UE_A 10 may update the configured old user controlled list for SOR exemption to the new user controlled list for SOR exemption that has been received. In other words, in the case that the UE_A 10 receives the 6th identification information including the new user controlled list for SOR exemption, the UE_A 10 may delete the old user controlled list for SOR exemption, and may store the new user controlled list for SOR exemption.

The UE_A 10 may store the stored user controlled list for SOR exemption and/or information included in the user controlled list for SOR exemption, until the UE_A 10 receives a new user controlled list for SOR exemption next, or until power of the UE is turned off, or until the USIM is removed.

In other words, in a case that a new USIM is inserted, the UE_A 10 may delete the stored user controlled list for SOR exemption and/or information included in the user controlled list for SOR exemption. Conversely, in a case that power of the UE is turned off, the UE_A 10 need not delete and may continue holding the stored user controlled list for SOR exemption and/or information included in the user controlled list for SOR exemption.

Furthermore, the UE_A 10 that has received the 6th identification information while the first timer is running may stop the first timer, and start the first timer value based on the new user controlled list for SOR exemption, based on reception of the new user controlled list for SOR exemption.

Alternatively, even in a case that the UE_A 10 that has received the 6th identification information while the first timer is running receives the new user controlled list for SOR exemption, the UE_A 10 may continue counting without stopping the running first timer. In that case, the UE_A 10 may update from the stored old user controlled list for SOR exemption to the new user controlled list for SOR exemption, based on expiration or stop of the first timer. In other words, the UE_A 10 that has received the 6th identification information while the first timer is running may update from the stored old user controlled list for SOR exemption to the new user controlled list for SOR exemption included in the 6th identification information after stop or expiration of the first timer.

Furthermore, in a case that the UE_A 10 receives the 6th identification information while the first timer is running, the UE_A 10 may update the user controlled list for SOR exemption stored by the UE_A 10. Furthermore, in the case that the UE_A 10 receives the 6th identification information while the first timer is running, the UE_A 10 may perform a behavior of a case that the user controlled list for SOR exemption is updated while the first timer is running.

In other words, in a case that the UE_A 10 receives the user controlled list for SOR exemption while the first timer is running, the UE_A 10 may update the user controlled list for SOR exemption stored by the UE_A 10. Furthermore, in the case that the UE_A 10 receives the user controlled list for SOR exemption while the first timer is running, the UE_A 10 may perform a behavior of a case that the user controlled list for SOR exemption is updated while the first timer is running.

Furthermore, in a case that the UE_A 10 receives the information indicating the service types that can be configured for the user controlled list for SOR exemption while the first timer is running, the UE_A 10 may update the information indicating the service types that can be configured for the user controlled list for SOR exemption and/or the user controlled list for SOR exemption stored by the UE_A 10. Furthermore, in the case that the UE_A 10 receives the information indicating the service types that can be configured for the user controlled list for SOR exemption while the first timer is running, the UE_A 10 may perform a behavior of a case that the user controlled list for SOR exemption is updated while the first timer is running.

Furthermore, in the case that the user controlled list for SOR exemption is updated while the first timer is running, the UE_A 10 may replace the value of the first timer with the value included in the SOR-CMCI, without stopping and/or restarting the first timer. In other words, in the case that the user controlled list for SOR exemption is updated while the first timer is running, the value of the first timer may be updated to the value included in the SOR-CMCI, without being stopped and/or restarted.

More specifically, in the case that the user controlled list for SOR exemption is updated while the first timer is running, the UE_A 10 may update the value of the first timer to the value included in the stored SOR-CMCI, without stopping and/or restarting the first timer. In other words, in the case that the user controlled list for SOR exemption is updated while the first timer is running, the value of the first timer may be replaced with the value included in the stored SOR-CMCI, without being stopped and/or restarted.

Here, the value included in the SOR-CMCI may be a value other than infinity. In other words, the value included in the stored SOR-CMCI may be a value other than infinity.

Conversely, in the case that the user controlled list for SOR exemption is updated while the first timer is running, the UE_A 10 may configure the value of the first timer to infinity. In other words, in the case that the user controlled list for SOR exemption is updated while the first timer is running, the value of the first timer may be configured to infinity.

More specifically, in the case that the user controlled list for SOR exemption is updated while the first timer is running, the UE_A 10 may configure the value of the first timer to infinity, without stopping and/or restarting the first timer. In other words, in the case that the user controlled list for SOR exemption is updated while the first timer is running, the value of the first timer may be configured to infinity, without being stopped and/or restarted.

Furthermore, in the case that the user controlled list for SOR exemption is updated while the first timer is running, the UE_A 10 may check whether the criteria/criterion matching the service(s) being performed is included in the stored SOR-CMCI.

Note that, in a case that the criteria/criterion matching the service(s) being performed is included in the stored SOR-CMCI, the UE_A 10 may update the value of the first timer to the value included in the stored SOR-CMCI, without stopping and/or restarting the first timer. In other words, in the case that the criteria/criterion matching the service(s) being performed is included in the stored SOR-CMCI, the value of the first timer may be replaced with the value included in the stored SOR-CMCI, without being stopped and/or restarted.

More specifically, in a case that the matching criteria/criterion is included, and the value of the first timer in the SOR-CMCI indicates infinity, the UE_A 10 may configure infinity to the value of the first timer associated with the service(s). In other words, in the case that the matching criteria/criterion is included, and the value of the first timer in the SOR-CMCI indicates infinity, the value of the first timer associated with the service(s) may be configured to infinity.

Furthermore, in a case that the matching criteria/criterion is included, and the value included in the SOR-CMCI is not infinity and is smaller than the current value of the running first timer associated with the service(s), the UE_A 10 may update the value of the first timer associated with the service(s) to the value included in the SOR-CMCI, without stopping and/or restarting the first timer. In other words, in the case that the matching criteria/criterion is included, and the value included in the SOR-CMCI is not infinity and is smaller than the current value of the running first timer associated with the service(s), the value of the first timer associated with the service(s) may be replaced with the value included in the SOR-CMCI, without being stopped and/or restarted.

Furthermore, in a case that the UE_A 10 stores the configured user controlled list for SOR exemption, and the criteria/criterion matching the service(s) being performed is included in the user controlled list for SOR exemption, the UE_A 10 may configure infinity to the value of the first timer associated with the service(s). In other words, in the case that the UE_A 10 stores the configured user controlled list for SOR exemption, and the criteria/criterion matching the service(s) being performed is included in the user controlled list for SOR exemption, the value of the first timer associated with the service(s) may be configured to infinity.

Furthermore, in other cases not applying to the above condition, the UE_A 10 may maintain the state of the first timer associated with the service(s) without changing the state. In other words, in other cases not applying to the above condition, the first timer associated with the service(s) may be maintained with the state not being changed.

Furthermore, in the case that the user controlled list for SOR exemption is updated while the first timer is running, the UE_A 10 may check whether the criteria/criterion matching the service(s) being performed is included in the new user controlled list for SOR exemption.

Note that, in a case that the criteria/criterion matching the service(s) being performed is included in the new user controlled list for SOR exemption, and the current value of the running first timer associated with the service(s) is not infinity, the UE_A 10 may configure infinity to the value of the first timer associated with the service(s). In other words, in the case that the criteria/criterion matching the service(s) being performed is included in the new user controlled list for SOR exemption, and the current value of the running first timer associated with the service(s) is not infinity, the value of the first timer associated with the service(s) may be configured to infinity.

Conversely, in a case that the criteria/criterion matching the service(s) being performed is not included in the new user controlled list for SOR exemption and is included in the stored SOR-CMCI, the UE_A 10 may update the value of the first timer to the value included in the stored SOR-CMCI, without stopping and/or restarting the first timer. In other words, in the case that the criteria/criterion matching the service(s) being performed is not included in the new user controlled list for SOR exemption and is included in the stored SOR-CMCI, the value of the first timer may be replaced with the value included in the stored SOR-CMCI, without being stopped and/or restarted.

More specifically, in a case that the criteria/criterion matching the service(s) being performed is not included in the new user controlled list for SOR exemption and is included in the stored SOR-CMCI, and the value included in the SOR-CMCI is smaller than the current value of the running first timer associated with the service(s), the UE_A 10 may update the value of the first timer associated with the service(s) to the value included in the SOR-CMCI, without stopping and/or restarting the first timer. In other words, in the case that the criteria/criterion matching the service(s) being performed is not included in the new user controlled list for SOR exemption and is included in the stored SOR-CMCI, and the value included in the SOR-CMCI is smaller than the current value of the running first timer associated with the service(s), the value of the first timer associated with the service(s) may be replaced with the value included in the SOR-CMCI, without being stopped and/or restarted.

Furthermore, in other cases not applying to the above condition, the UE_A 10 may maintain the state of the first timer associated with the service(s) without changing the state. In other words, in other cases not applying to the above condition, the first timer associated with the service(s) may be maintained with the state not being changed.

Furthermore, in the case that the user controlled list for SOR exemption is updated while the first timer is running, the UE_A 10 may check whether the criteria/criterion matching the service(s) being performed is included in the new user controlled list for SOR exemption.

Note that, in a case that the matching criteria/criterion is included, and the current value of the running first timer associated with the service(s) is not infinity, the UE_A 10 may configure infinity to the value of the first timer associated with the service(s). In other words, in the case that the matching criteria/criterion is included, and the current value of the running first timer associated with the service(s) is not infinity, the value of the first timer associated with the service(s) may be configured to infinity.

Conversely, in a case that the matching criteria/criterion is not included, and the current value of the running first timer associated with the service(s) is infinity, the UE_A 10 may check whether the criteria/criterion matching the service(s) being performed is included in the stored SOR-CMCI.

Note that, in a case that the criteria/criterion matching the service(s) being performed is included in the SOR-CMCI, the UE_A 10 may update the value of the first timer associated with the service(s) to the value included in the SOR-CMCI, without stopping and/or restarting the first timer. In other words, in the case that the criteria/criterion matching the service(s) being performed is included in the SOR-CMCI, the value of the first timer associated with the service(s) may be replaced with the value included in the SOR-CMCI, without being stopped and/or restarted.

More specifically, in a case that the criteria/criterion matching the service(s) being performed is included in the SOR-CMCI, and the value of the first timer included in the SOR-CMCI is not infinity, the UE_A 10 may update the value of the first timer associated with the service(s) to the value included in the SOR-CMCI, without stopping and/or restarting the first timer. In other words, in the case that the criteria/criterion matching the service(s) being performed is included in the SOR-CMCI, and the value of the first timer included in the SOR-CMCI is not infinity, the value of the first timer associated with the service(s) may be replaced with the value included in the SOR-CMCI, without being stopped and/or restarted.

Furthermore, in other cases not applying to the above condition, the UE_A 10 may maintain the state of the first timer associated with the service(s) without changing the state. In other words, in other cases not applying to the above condition, the first timer associated with the service(s) may be maintained with the state not being changed.

Furthermore, in the case that the user controlled list for SOR exemption is updated while the first timer is running, the UE_A 10 may check whether the criteria/criterion matching the service(s) being performed is included in the new user controlled list for SOR exemption.

Note that, in the case that the matching criteria/criterion is included, and the current value of the running first timer associated with the service(s) is not infinity, the UE_A 10 may configure infinity to the value of the first timer associated with the service(s). In other words, in the case that the matching criteria/criterion is included, and the current value of the running first timer associated with the service(s) is not infinity, the value of the first timer associated with the service(s) may be configured to infinity.

Conversely, in the case that the matching criteria/criterion is not included, and the current value of the running first timer associated with the service(s) is infinity, the UE_A 10 may check whether the criteria/criterion matching the service(s) being performed is included in the stored SOR-CMCI.

Note that, in the case that the criteria/criterion matching the service(s) being performed is included in the SOR-CMCI, the UE_A 10 may update the value of the first timer associated with the service(s) to the value included in the SOR-CMCI, without stopping and/or restarting the first timer. In the case that the criteria/criterion matching the service(s) being performed is included in the SOR-CMCI, the value of the first timer associated with the service(s) may be replaced with the value included in the SOR-CMCI, without being stopped and/or restarted.

More specifically, in the case that the criteria/criterion matching the service(s) being performed is included in the SOR-CMCI, and the value of the first timer included in the SOR-CMCI is not infinity, the UE_A 10 may update the value of the first timer associated with the service(s) to the value included in the SOR-CMCI, without stopping and/or restarting the first timer. In other words, in the case that the criteria/criterion matching the service(s) being performed is included in the SOR-CMCI, and the value of the first timer included in the SOR-CMCI is not infinity, the value of the first timer associated with the service(s) may be replaced with the value included in the SOR-CMCI, without being stopped and/or restarted.

Conversely, in a case that the criteria/criterion matching the service(s) being performed is not included in the SOR-CMCI, the UE_A 10 may configure 0 to the value of the first timer associated with the service(s). In other words, in the case that the criteria/criterion matching the service(s) being performed is not included in the SOR-CMCI, the value of the first timer associated with the service(s) may be configured to 0.

Furthermore, in the case that the criteria/criterion matching the service(s) being performed is not included in the SOR-CMCI, the UE_A 10 may stop the first timer associated with the service(s). In other words, in the case that the criteria/criterion matching the service(s) being performed is not included in the SOR-CMCI, the value of the first timer associated with the service(s) may be stopped.

Furthermore, in other cases not applying to the above condition, the UE_A 10 may maintain the state of the first timer associated with the service(s) without changing the state. In other words, in other cases not applying to the above condition, the first timer associated with the service(s) may be maintained with the state not being changed.

Furthermore, in the case that the user controlled list for SOR exemption is updated while the first timer is running, the UE_A 10 may check whether the criteria/criterion matching the service(s) being performed is included in the new user controlled list for SOR exemption.

Note that, in the case that the matching criteria/criterion is included, and the current value of the running first timer associated with the service(s) is not infinity, the UE_A 10 may configure infinity to the value of the first timer associated with the service(s). In other words, in the case that the matching criteria/criterion is included, and the current value of the running first timer associated with the service(s) is not infinity, the value of the first timer associated with the service(s) may be configured to infinity.

Conversely, in a case that the matching criteria/criterion is not included, the current value of the running first timer associated with the service(s) is infinity, the criteria/criterion matching the service(s) being performed is included in the SOR-CMCI, and the value of the first timer included in the SOR-CMCI is not infinity, the UE_A 10 may update the value of the first timer associated with the service(s) to the value included in the SOR-CMCI, without stopping and/or restarting the first timer. In other words, in the case that the matching criteria/criterion is not included, the current value of the running first timer associated with the service(s) is infinity, the criteria/criterion matching the service(s) being performed is included in the SOR-CMCI, and the value of the first timer included in the SOR-CMCI is not infinity, the value of the first timer associated with the service(s) may be replaced with the value included in the SOR-CMCI, without being stopped and/or restarted.

Furthermore, in a case that the matching criteria/criterion is not included, the current value of the running first timer associated with the service(s) is infinity, and the criteria/criterion matching the service(s) being performed is not included in the SOR-CMCI, the UE_A 10 may configure 0 to the value of the first timer associated with the service(s). In other words, in the case that the matching criteria/criterion is not included, the current value of the running first timer associated with the service(s) is infinity, and the criteria/criterion matching the service(s) being performed is not included in the SOR-CMCI, the value of the first timer associated with the service(s) may even be configured to 0.

Furthermore, in other cases not applying to the above condition, the UE_A 10 may maintain the state of the first timer associated with the service(s) without changing the state. In other words, in other cases not applying to the above condition, the first timer associated with the service(s) may be maintained with the state not being changed.

Furthermore, in a case that the 1st identification information is received, the UE_A 10 may be configured to be prohibited from updating the user controlled list for SOR exemption. In other words, in the case that the 1st identification information is received, the user controlled list for SOR exemption may be configured not to be able to be updated.

Furthermore, in the case that the 1st identification information is received, the UE_A 10 may be configured so that update by the user of the UE_A 10 is prohibited for the user controlled list for SOR exemption. In other words, in the case that the 1st identification information is received, the user controlled list for SOR exemption may be configured so that update by the user of the UE_A 10 cannot be performed.

More specifically, in a case that the 1st identification information is received while the first timer is running, the UE_A 10 may be configured to be prohibited from updating the stored user controlled list for SOR exemption. In other words, in the case that the 1st identification information is received while the first timer is running, the stored user controlled list for SOR exemption may be configured not to be able to be updated.

Furthermore, in the case that the 1st identification information is received while the first timer is running, the UE_A 10 may be configured so that update by the user of the UE_A 10 is prohibited for the stored user controlled list for SOR exemption. In other words, in the case that the 1st identification information is received while the first timer is running, the stored user controlled list for SOR exemption may be configured so that update by the user of the UE_A 10 cannot be performed.

In the case that the 1st identification information is received while the first timer is running, the UE_A 10 may be configured to be prohibited from updating the stored user controlled list for SOR exemption, until power of the UE is turned off or until the USIM is removed.

In other words, in a case that a new USIM is inserted, the UE_A 10 may change the configuration to be allowed to update the user controlled list for SOR exemption. Conversely, in a case that power of the UE is turned off, the UE_A 10 may maintain the configuration to be prohibited from updating the stored user controlled list for SOR exemption.

Here, "update of the user controlled list for SOR exemption is prohibited" may mean that addition of service(s) to the user controlled list for SOR exemption is prohibited. In other words, "update of the user controlled list for SOR exemption is prohibited" may mean that addition of service(s) to the user controlled list for SOR exemption is prohibited by the user of the UE_A 10. Furthermore, "update of the user controlled list for SOR exemption is prohibited" may mean that deletion of service(s) from the user controlled list for SOR exemption is prohibited. In other words, "update of the user controlled list for SOR exemption is prohibited" may mean that deletion of service(s) from the user controlled list for SOR exemption is prohibited by the user of the UE_A 10.

Furthermore, the UE_A 10 may simultaneously run the first timer that is configured to infinity and is associated with the first service and the first timer that is configured to the value included in the SOR-CMCI and is associated with the first service. In other words, the first timer that is configured to infinity and is associated with the first service and the first timer that is configured to the value included in the SOR-CMCI and is associated with the first service may be started or may be run.

Here, the first service may be the service of MMTEL voice call. Furthermore, the first service may be the service of MMTEL video call. Furthermore, the first service may be MO SMS over NAS (SMSoNAS) or MO SMSoIP.

Furthermore, in a case that the UE_A 10 receives the 1st identification information and the 6th identification information, the UE_A 10 may start or may run the first timer that is configured to infinity and is associated with the first service and the first timer that is configured to the value included in the received SOR-CMCI and is associated with the first service. In other words, in the case that the UE_A 10 receives the 1st identification information and the 6th identification information, the first timer that is configured to infinity and is associated with the first service and the first timer that is configured to the value included in the received SOR-CMCI and is associated with the first service may be started or may be run.

More specifically, in a case that the criteria/criterion matching the service(s) being performed is included in the user controlled list for SOR exemption and the SOR-CMCI, the UE_A 10 may start or may run the first timer associated with the service(s) that is configured to infinity and the first timer associated with the service(s) that is configured to the value included in the received SOR-CMCI. In other words, in the case that the criteria/criterion matching the service(s) being performed is included in the user controlled list for SOR exemption and the SOR-CMCI, the first timer associated with the service(s) that is configured to infinity and the first timer associated with the service(s) that is configured to the value included in the received SOR-CMCI may be started or may be run.

Furthermore, in a case that the UE_A 10 receives the 1st identification information, the UE_A 10 stores the user controlled list for SOR exemption, and the criteria/criterion matching the service(s) being performed is also included in the user controlled list for SOR exemption, the UE_A 10 may start or may run the first timer associated with the service(s) that is configured to infinity and the first timer associated with the service(s) that is configured to the value included in the received SOR-CMCI. In other words, in the case that the UE_A 10 receives the 1st identification information, the UE_A 10 stores the user controlled list for SOR exemption, and the criteria/criterion matching the service(s) being performed is also included in the user controlled list for SOR exemption, the first timer associated with the service(s) that is configured to infinity and the first timer associated with the service(s) that is configured to the value included in the received SOR-CMCI may be started or may be run.

Furthermore, in a case that the UE_A 10 receives the 6th identification information, the UE_A 10 stores the SOR-CMCI, and the criteria/criterion matching the service(s) being performed is also included in the SOR-CMCI, the UE_A 10 may start or may run the first timer associated with the service(s) that is configured to infinity and the first timer associated with the service(s) that is configured to the value included in the SOR-CMCI. In other words, in the case that the UE_A 10 receives the 6th identification information, the UE_A 10 stores the SOR-CMCI, and the criteria/criterion matching the service(s) being performed is also included in the SOR-CMCI, the first timer associated with the service(s) that is configured to infinity and the first timer associated with the service(s) that is configured to the value included in the SOR-CMCI may be started or may be run.

Furthermore, in a case that the user controlled list for SOR exemption is updated, the UE_A 10 stores the SOR-CMCI, and the criteria/criterion matching the service(s) being performed is also included in the SOR-CMCI, the UE_A 10 may start or may run the first timer associated with the service(s) that is configured to infinity and the first timer associated with the service(s) that is configured to the value included in the SOR-CMCI. In other words, in the case that the user controlled list for SOR exemption is updated, the UE_A 10 stores the SOR-CMCI, and the criteria/criterion matching the service(s) being performed is also included in the SOR-CMCI, the first timer associated with the service(s) that is configured to infinity and the first timer associated with the service(s) that is configured to the value included in the SOR-CMCI may be started or may be run.

Furthermore, in a case that the UE_A 10 receives the 1st identification information and/or the 6th identification information, and the criteria/criterion matching the service(s) being performed is included in the user controlled list for SOR exemption and the SOR-CMCI, the UE_A 10 may start or may run the first timer associated with the service(s) that is configured to infinity and the first timer associated with the service(s) that is configured to the value included in the received SOR-CMCI. In other words, in the case that the UE_A 10 receives the 1st identification information and/or the 6th identification information, and the criteria/criterion matching the service(s) being performed is included in the user controlled list for SOR exemption and the SOR-CMCI, the first timer associated with the service(s) that is configured to infinity and the first timer associated with the service(s) that is configured to the value included in the received SOR-CMCI may be started or may be run.

Furthermore, in a case that the user controlled list for SOR exemption and/or the SOR-CMCI is updated, and the criteria/criterion matching the service(s) being performed is included in the user controlled list for SOR exemption and the SOR-CMCI, the UE_A 10 may start or may run the first timer associated with the service(s) that is configured to infinity and the first timer associated with the service(s) that is configured to the value included in the received SOR-CMCI. In other words, in the case that the user controlled list for SOR exemption and/or the SOR-CMCI is updated, and the criteria/criterion matching the service(s) being performed is included in the user controlled list for SOR exemption and the SOR-CMCI, the first timer associated with the service(s) that is configured to infinity and the first timer associated with the service(s) that is configured to the value included in the received SOR-CMCI may be started or may be run.

Furthermore, in a case that the UE_A 10 receives the 1st identification information and/or the 6th identification information while the first timer is running, the UE_A 10 may stop the first timer configured to infinity, or may maintain running of the first timer configured to the value included in the received SOR-CMCI. In other words, in the case that the UE_A 10 receives the 1st identification information and/or the 6th identification information while the first timer is running, the first timer configured to infinity may be stopped, or the first timer configured to the value included in the received SOR-CMCI may be kept running.

More specifically, in a case that the UE_A 10 receives the 1st identification information and/or the 6th identification information while the first timer is running, and the criteria/criterion matching the service(s) being performed is not included in the user controlled list for SOR exemption and is included in the SOR-CMCI, the UE_A 10 may stop the first timer associated with the service(s) that is configured to infinity, or may maintain running of the first timer associated with the service(s) that is configured to the value included in the received SOR-CMCI. In other words, in the case that the UE_A 10 receives the 1st identification information and/or the 6th identification information while the first timer is running, and the criteria/criterion matching the service(s) being performed is not included in the user controlled list for SOR exemption and is included in the SOR-CMCI, the first timer associated with the service(s) that is configured to infinity may be stopped, or the first timer associated with the service(s) that is configured to the value included in the received SOR-CMCI may be kept running.

Furthermore, in a case that the user controlled list for SOR exemption and/or the SOR-CMCI is updated while the first timer is running, the UE_A 10 may stop the first timer configured to infinity, or may maintain running of the first timer configured to the value included in the received SOR-CMCI. In other words, in the case that the user controlled list for SOR exemption and/or the SOR-CMCI is updated while the first timer is running, the first timer configured to infinity may be stopped, or the first timer configured to the value included in the received SOR-CMCI may be kept running.

More specifically, in a case that the user controlled list for SOR exemption and/or the SOR-CMCI is updated while the first timer is running, and the criteria/criterion matching the service(s) being performed is not included in the user controlled list for SOR exemption and is included in the SOR-CMCI, the UE_A 10 may stop the first timer associated with the service(s) that is configured to infinity, or may maintain running of the first timer associated with the service(s) that is configured to the value included in the received SOR-CMCI. In other words, in the case that the user controlled list for SOR exemption and/or the SOR-CMCI is updated while the first timer is running, and the criteria/criterion matching the service(s) being performed is not included in the user controlled list for SOR exemption and is included in the SOR-CMCI, the first timer associated with the service(s) that is configured to infinity may be stopped, or the first timer associated with the service(s) that is configured to the value included in the received SOR-CMCI may be kept running.

Furthermore, the UE_A 10 may start the first timer. In other words, the UE_A 10 may run the first timer. More specifically, furthermore, in a case that the 1st identification information and/or the 6th identification information is received, the UE_A 10 may start the first timer. In other words, in the case that the 1st identification information and/or the 6th identification information is received, the UE_A 10 may run the first timer.

Here, the first timer may be associated with the PDU session(s) being performed or the service(s) being performed. In other words, the first timer may be associated with a specific PDU session. Furthermore, the first timer may be associated with the first service.

Here, the first service may be the service of MMTEL voice call. Furthermore, the first service may be the service of MMTEL video call. Furthermore, the first service may be MO SMS over NAS (SMSoNAS) or MO SMSoIP.

Furthermore, the first timer may be associated with the PDU session(s) or the service(s) matching the criteria/criterion included in the SOR-CMCI. Furthermore, the first timer may be associated with the service(s) matching the criteria/criterion included in the user controlled list for SOR exemption. In other words, the first timer may be associated with the first service matching the criteria/criterion included in the user controlled list for SOR exemption.

Furthermore, the first timer may be configured to the value included in the SOR-CMCI. More specifically, in a case that the first timer is associated with the PDU session(s) or the service(s) matching the criteria/criterion included in the SOR-CMCI, the first timer may be configured to the value included in the SOR-CMCI.

Furthermore, the first timer may be configured to infinity. More specifically, in a case that the first timer is associated with the service(s) matching the criteria/criterion included in the user controlled list for SOR exemption, the first timer may be configured to infinity. In other words, in a case that the first timer is associated with the first service matching the criteria/criterion included in the user controlled list for SOR exemption, the first timer may be configured to infinity.

The UE_A 10 that has received the 2nd identification information and the 3rd identification information may check whether the criteria/criterion indicated by the 2nd identification information is included in the SOR-CMCI stored by the UE_A 10 and update the timer value associated with the criteria/criterion indicated by the 2nd identification information of the SOR-CMCI to the timer value included in the 3rd identification information, or may add and store the 2nd identification information and the 3rd identification information to and in the SOR-CMCI.

Specifically, for example, the UE_A 10 that has received the 2nd identification information including S-NSSAI_A and the 3rd identification information including T_A checks whether S-NSSA_A is stored in the stored SOR-CMCI as the criterion. In a case that S-NSSA_A is stored in the stored SOR-CMCI as the criterion, the UE_A 10 may update the timer value associated with S-NSSAI_A to T_A. In a case that S-NSSA_A is not stored in the stored SOR-CMCI as the criterion, the UE_A 10 may associate S-NSSAI_A and the timer value T_A and add to the stored SOR-CMCI.

Similarly, the UE_A 10 that has received the 2nd identification information including DNN_A and the 3rd identification information including T_A checks whether DNN_A is stored in the stored SOR-CMCI as the criterion. In a case that DNN_A is stored in the stored SOR-CMCI as the criterion, the UE_A 10 may update the timer value associated with DNN_A to T_A. In a case that DNN_A is not stored in the stored SOR-CMCI as the criterion, the UE_A 10 may associate DNN_A and the timer value T_A and add to the stored SOR-CMCI.

Similarly, the UE_A 10 that has received the 2nd identification information including information indicating a specific service type (for example, IMS registration related signalling) as the criterion and the 3rd identification information including T_A checks whether the service type is stored in the stored SOR-CMCI as the criterion. In a case that the service type is stored in the stored SOR-CMCI as the criterion, the UE_A 10 may update the timer value associated with the service type to T_A. In a case that the service type is not stored in the stored SOR-CMCI as the criterion, the UE_A 10 may use the information indicating the service type as the criterion, associate the timer value T_A with the criterion, and add to the stored SOR-CMCI.

Similarly, the UE_A 10 that has received the 2nd identification information including information indicating matching of all of the criteria and the 3rd identification information including T_A checks whether the timer value associated with a condition matching all of the criteria is stored in the stored SOR-CMCI. In a case that the timer value associated with the condition matching all of the criteria is stored in the stored SOR-CMCI, the UE_A 10 may update the timer value associated with the condition matching all of the criteria to T_A. In a case that the timer value associated with the condition matching all of the criteria is not stored in the stored SOR-CMCI, the UE_A 10 may add T_A to the stored SOR-CMCI as the timer value associated with the condition matching all of the criteria.

The UE_A 10 that has received the 4th identification information may recognize a type of a value included in the 2nd identification information, based on the 3rd identification information. Specifically, in a case that the 4th identification information includes information indicating an S-NSSAI, the UE_A 10 may recognize that the 2nd identification information is a value of the S-NSSAI. In a case that the 4th identification information includes information indicating a DNN, the UE_A 10 may recognize that the 2nd identification information is a value of the DNN. In a case that the 4th identification information includes information indicating a 5QI, the UE_A 10 may recognize that the 2nd identification information is a value of the 5QI. In a case that the 4th identification information includes information indicating a combination of an S-NSSAI and a DNN, the UE_A 10 may recognize that the 2nd identification information includes a value of the DNN and a value of the S-NSSAI.

The UE_A 10 that has received the 4th identification information may recognize that the 2nd identification information includes a value indicating criteria/criterion of a PDU session attribute.

The UE_A 10 that has received the 2nd identification information, the 3rd identification information, and the 5th identification information may check whether the criteria/criterion indicated by the 2nd identification information is included in the SOR-CMCI stored by the UE_A 10, update the timer value associated with the criteria/criterion indicated by the 2nd identification information of the SOR-CMCI to the timer value included in the 3rd identification information, and update the priority associated with the criteria/criterion indicated by the 2nd identification information to the value indicated by the 5th identification information, or may add and store the 2nd identification information, the 3rd identification information, and the 5th identification information to and in the stored SOR-CMCI.

In a case that the UE_A 10 that has received the first message including the SOR transport container information element receives information indicating that the SOR transport container information element includes the SOR-CMCI, the UE_A 10 may recognize that the SOR transport container information element includes one or more of at least one piece of information out of the 1st to 5th pieces of identification information and/or includes the SOR-CMCI.

In a case that the UE_A 10 that has received the first message including the SOR transport container information element receives information indicating that the SOR transport container information element includes the user controlled list for SOR exemption, the UE_A 10 may recognize that the SOR transport container information element includes the 6th identification information and/or includes the user controlled list for SOR exemption.

Next, the UE_A 10 may transmit the second message to the AMF 140 (S602). The second message may be the registration complete message, may be the CONFIGURATION UPDATE COMPLETE message, or may be the uplink NAS transport message (UL NAS TRANSPORT message). Furthermore, the second message may be the UL NAS transport message (Uplink NAS TRANSPORT message).

The UE_A 10 may determine transmission of the second message and/or identification information to be included in the second message, based on information included in the received first message.

Specifically, the UE_A 10 may determine transmission of the second message, based on information indicating that an ACK is to be requested, which is included in the SOR transport container information element included in the received first message.

Here, the UE_A 10 may include the 11th identification information and/or the 12th identification information in the second message. Furthermore, the second message including the 11th identification information and/or the 12th identification information may be transmitted.

Furthermore, in a case that the SOR-CMCI is configured for the UE_A 10, the UE_A 10 may transmit the second message to the AMF 140. More specifically, in the case that the SOR-CMCI is configured for the UE_A 10, the UE_A 10 may transmit the second message including the 11th identification information to the AMF 140.

Furthermore, in a case that the user controlled list for SOR exemption is configured for the UE_A 10, the UE_A 10 may transmit the second message to the AMF 140. More specifically, in the case that the user controlled list for SOR exemption is configured for the UE_A 10, the UE_A 10 may transmit the second message including the 12th identification information to the AMF 140.

Furthermore, in a case that the user controlled list for SOR exemption of the UE_A 10 is updated, the UE_A 10 may transmit the second message to the AMF 140. More specifically, in the case that the user controlled list for SOR exemption of the UE_A 10 is updated, the UE_A 10 may transmit the second message including the 12th identification information to the AMF 140.

Furthermore, in a case that the user controlled list for SOR exemption is re-configured for the UE_A 10, the UE_A 10 may transmit the second message to the AMF 140. More specifically, in the case that the user controlled list for SOR exemption is re-configured for the UE_A 10, the UE_A 10 may transmit the second message including the 12th identification information to the AMF 140.

Furthermore, the UE_A 10 may include the 11th identification information and/or the 12th identification information in the SOR transport container information element. In other words, the UE_A 10 may include the SOR transport container information element including the 11th identification information and/or the 12th identification information in the second message.

Furthermore, the UE_A 10 may include the 12th identification information in the SOR transport container information element together with the 11th identification information. In other words, the UE_A 10 may include the SOR transport container information element including the 11th identification information and the 12th identification information in the second message.

In yet other words, the 12th identification information may be included in the SOR transport container information element together with the 11th identification information. Furthermore, the SOR transport container information element including the 11th identification information and the 12th identification information may be included in the second message.

Next, the AMF 140 may receive the second message (S602). More specifically, in a case that the UE_A 10 transmits the second message, the AMF 140 may receive the second message transmitted by the UE_A 10.

Furthermore, the AMF 140 may transfer information included in the received second message to the HPLMN and/or a control apparatus of the HPLMN, based on reception of the second message. Specifically, in a case that the 11th identification information is included in the second message, the AMF 140 may transfer the received 11th identification information to the HPLMN and/or the control apparatus of the HPLMN. Furthermore, in a case that the 12th identification information is included in the second message, the AMF 140 may transfer the received 12th identification information to the HPLMN and/or the control apparatus of the HPLMN.

Furthermore, in a case that the SOR transport container information element is included in the second message, the AMF 140 may transfer the received SOR transport container information element to the HPLMN and/or the control apparatus of the HPLMN. Furthermore, in the case that the SOR transport container information element is included in the second message, the AMF 140 may transfer information included in the received SOR transport container information element to the HPLMN and/or the control apparatus of the HPLMN. Specifically, in the case that the SOR transport container information element is included in the second message, the AMF 140 may transfer the 11th identification information and/or the 12th identification information included in the received SOR transport container information element to the HPLMN and/or the control apparatus of the HPLMN.

In other words, information included in the second message may be transferred or may be provided to the HPLMN and/or the control apparatus of the HPLMN by the VPLMN and/or a control apparatus of the VPLMN. Specifically, in the case that the 11th identification information is included in the second message, the 11th identification information may be transferred or may be provided to the HPLMN and/or the control apparatus of the HPLMN by the VPLMN and/or the control apparatus of the VPLMN. Furthermore, in the case that the 12th identification information is included in the second message, the 12th identification information may be transferred or may be provided to the HPLMN and/or the control apparatus of the HPLMN by the VPLMN and/or the control apparatus of the VPLMN.

Furthermore, in the case that the SOR transport container information element is included in the second message, the SOR transport container information element may be transferred or may be provided to the HPLMN and/or the control apparatus of the HPLMN by the VPLMN and/or the control apparatus of the VPLMN. Furthermore, in the case that the SOR transport container information element is included in the second message, the information included in the SOR transport container information element may be transferred or may be provided to the HPLMN and/or the control apparatus of the HPLMN by the VPLMN and/or the control apparatus of the VPLMN. Specifically, in the case that the SOR transport container information element is included in the second message, the 11th identification information and/or the 12th identification information included in the SOR transport container information element may be transferred or may be provided to the HPLMN and/or the control apparatus of the HPLMN by the VPLMN and/or the control apparatus of the VPLMN.

Furthermore, the HPLMN and/or the control apparatus of the HPLMN receives the SOR transport container information element, and/or the 11th identification information, and/or the 12th identification information from the AMF 140. In a case that the HPLMN and/or the control apparatus of the HPLMN receives the SOR transport container information element, the HPLMN and/or the control apparatus of the HPLMN may recognize and store the information included in the SOR transport container information element. Specifically, in a case that the SOR transport container information element includes the 11th identification information, the HPLMN and/or the control apparatus of the HPLMN may recognize and store the 11th identification information. Furthermore, in a case that the SOR transport container information element includes the 12th identification information, the HPLMN and/or the control apparatus of the HPLMN may recognize and store the 12th identification information.

Furthermore, in a case that the HPLMN and/or the control apparatus of the HPLMN receives the 11th identification information, the HPLMN and/or the control apparatus of the HPLMN may recognize and store the 11th identification information. Furthermore, in a case that the HPLMN and/or the control apparatus of the HPLMN receives the 12th identification information, the HPLMN and/or the control apparatus of the HPLMN may recognize and store the 12th identification information.

Through the above, the NW may notify the UE_A 10 of the new SOR-CMCI, and the UE_A 10 may update the stored SOR-CMCI.

3.2. Second Embodiment

The following will describe an embodiment including behaviors in configuration, in start and stop, and after expiration of the first timer that manages the timing at which the UE_A 10 transitions from the connected mode to the idle mode. Furthermore, an example of a behavior of the UE_A 10 while the first timer is running will be described.

First, the UE_A 10 may be in a state of storing the SOR-CMCI at least in the connected mode or a connected state. Note that the SOR-CMCI may be a value configured in advance, or may be information notified from the HPLMN.

The UE_A 10 receives the SOR transport container information element from the AMF 140, and in a case that a list of combinations of recommended (or prioritized) PLMNs and access technologies is included in the SOR information included in the received SOR transport container information element, and a PLMN having priority higher than the currently connected Public Land Mobile Network (PLMN) is included in the received list of combinations of recommended (or prioritized) PLMNs and access technologies, the UE_A 10 may select a timer value to be set to the first timer, set the selected timer value to the first timer, and start the first timer.

Alternatively, the UE_A 10 may select a timer value to be set to the first timer, set the selected timer value to the first timer, and start the first timer, based on the PDU session establishment procedure. Specifically, the UE_A 10 may select a timer value to be set to the first timer, set the selected timer value to the first timer, and start the first timer, based on completion of PDU session establishment using the criteria/criterion included in the SOR-CMCI.

Furthermore, in a case that there is a running first timer, the UE_A 10 may stop the first timer, based on the PDU session establishment procedure. Furthermore, in the case that there is a running first timer, the UE_A 10 may stop the first timer, and start a new first timer, based on the PDU session establishment procedure.

The UE_A 10 may recognize completion of PDU session establishment using the criteria/criterion included in the SOR-CMCI, based on the PDU session accept message and/or information (the S-NSSAI, the DNN, the 5QI, or the like) associated with the PDU session(s) included in the PDU session accept message.

In other words, the UE_A 10 may select a timer value to be set to the first timer, set the selected timer value to the first timer, and start the first timer, based on reception of the PDU session accept message.

Alternatively, the UE_A 10 may select a timer value to be set to the first timer, set the selected timer value to the first timer, and start the first timer, based on movement and/or PLMN change and/or start of roaming.

The UE_A 10 may select a timer value to be set to the first timer, set the selected timer value to the first timer, and start the first timer, based on other triggers, regardless of the above triggers.

In a case of newly starting a first timer while one or more first timers are running, the UE_A 10 may stop running of the running first timer(s) or stop timing control by the running first timer(s).

A method in which the UE_A 10 selects the timer value to be set to the first timer will be described below. The UE_A 10 uses the stored SOR-CMCI for selection of the timer value to be set to the first timer.

In a case that the UE_A 10 stores the SOR-CMCI, the UE_A 10 checks whether the PDU session(s) matching the criteria/criterion included in the SOC-CMCI is established, or whether the service(s) indicated by the criteria/criterion is being performed. In a case that the PDU session(s) matching the criteria/criterion included in the SOC-CMCI is established, or the service(s) indicated by the criteria/criterion is being performed, the UE_A 10 selects the timer value associated with the criteria/criterion.

Furthermore, in a case that the PDU session(s) matching the criteria/criterion included in the SOC-CMCI is established, or the service(s) matching the criteria/criterion is being performed, the UE_A 10 may set the first timer value to the first timer, or may start the first timer to which the first timer is set.

In other words, in a case that the PDU session(s) is established using the information included in the SOC-CMCI, or the service(s) indicated by the information included in the SOC-CMCI is performed, the UE_A 10 may set the first timer value to the first timer, or may start the first timer to which the first timer is set.

Furthermore, in a case that multiple criteria are included in the SOC-CMCI, and multiple PDU sessions matching the criteria included in the SOC-CMCI are established, the first timer to which the first timer is set may be started for each PDU session. Furthermore, in a case that multiple criteria are included in the SOC-CMCI, and multiple services matching the criteria included in the SOC-CMCI are being performed, the first timer to which the first timer is set may be started for each service.

In other words, in a case that multiple criteria are included in the SOC-CMCI, and multiple PDU sessions using the information included in the SOC-CMCI are established, the UE_A 10 may start the first timer to which the first timer is set for each PDU session.

Furthermore, in a case that multiple criteria are included in the SOC-CMCI, and multiple services indicated by the information included in the SOC-CMCI are performed, the UE_A 10 may start the first timer to which the first timer is set for each service.

Furthermore, in a case that multiple pieces of SOC-CMCI are received, and multiple PDU sessions matching the criteria/criterion included in the pieces of SOC-CMCI are established, the first timer to which the first timer is set may be started for each PDU session. Furthermore, in a case that multiple pieces of SOC-CMCI are received, and multiple services matching the criteria/criterion included in the pieces of SOC-CMCI are being performed, the first timer to which the first timer is set may be started for each service.

In other words, in a case that multiple pieces of SOC-CMCI are received, and multiple PDU sessions using the information included in the pieces of SOC-CMCI are established, the UE_A 10 may start the first timer to which the first timer is set for each PDU session. Furthermore, in a case that multiple pieces of SOC-CMCI are received, and multiple services indicated by the information included in the pieces of SOC-CMCI are performed, the UE_A 10 may start the first timer to which the first timer is set for each service.

Conversely, in a case that the PDU session(s) matching the criteria/criterion included in the SOC-CMCI is not established, or the service(s) matching the criteria/criterion is not being performed, the UE_A 10 may perform the de-registration procedure.

In other words, in a case that the PDU session(s) is not established using the information included in the SOC-CMCI, or the service(s) indicated by the information included in the SOC-CMCI is not performed, the UE_A 10 may perform the de-registration procedure.

Furthermore, the UE_A 10 may perform the above behavior, based on reception of the first message including one or more pieces of identification information out of the 1st to 5th pieces of identification information.

More specifically, in a state in which the PDU session(s) matching the criteria/criterion included in the SOC-CMCI is established, in a case that the first message including one or more pieces of identification information out of the 1st to 5th pieces of identification information is received, the UE_A 10 may set the first timer value to the first timer, or may start the first timer to which the first timer is set. Furthermore, in a state in which the service(s) matching the criteria/criterion included in the SOC-CMCI is being performed, in the case that the first message including one or more pieces of identification information out of the 1st to 5th pieces of identification information is received, the UE_A 10 may set the first timer value to the first timer, or may start the first timer to which the first timer is set.

In other words, in a state in which the PDU session(s) is established using the information included in the SOC-CMCI, in the case that the first message including one or more pieces of identification information out of the 1st to 5th pieces of identification information is received, the UE_A 10 may set the first timer value to the first timer, or may start the first timer to which the first timer is set. Furthermore, in a state in which the service(s) indicated by the information included in the SOC-CMCI is performed, in the case that the first message including one or more pieces of identification information out of the 1st to 5th pieces of identification information is received, the UE_A 10 may set the first timer value to the first timer, or may start the first timer to which the first timer is set.

Furthermore, in a state in which multiple criteria are included in the SOC-CMCI, and multiple PDU sessions matching the criteria included in the SOC-CMCI are established, in the case that the first message including one or more pieces of identification information out of the 1st to 5th pieces of identification information is received, the first timer to which the first timer is set may be started for each PDU session. Furthermore, in a state in which multiple criteria are included in the SOC-CMCI, and multiple services matching the criteria included in the SOC-CMCI are being performed, in the case that the first message including one or more pieces of identification information out of the 1st to 5th pieces of identification information is received, the first timer to which the first timer is set may be started for each service.

In other words, in a state in which multiple criteria are included in the SOC-CMCI, and multiple PDU sessions using the information included in the SOC-CMCI are established, in the case that the first message including one or more pieces of identification information out of the 1st to 5th pieces of identification information is received, the UE_A 10 may start the first timer to which the first timer is set for each PDU session. Furthermore, in a state in which multiple criteria are included in the SOC-CMCI, and multiple services indicated by the information included in the SOC-CMCI are performed, in the case that the first message including one or more pieces of identification information out of the 1st to 5th pieces of identification information is received, the UE_A 10 may start the first timer to which the first timer is set for each service.

Furthermore, in a state in which multiple pieces of SOC-CMCI are received, and multiple PDU sessions matching the criteria/criterion included in the pieces of SOC-CMCI are established, in the case that the first message including one or more pieces of identification information out of the 1st to 5th pieces of identification information is received, the first timer to which the first timer is set may be started for each PDU session. Furthermore, in a state in which multiple pieces of SOC-CMCI are received, and multiple services matching the criteria/criterion included in the pieces of SOC-CMCI are being performed, in the case that the first message including one or more pieces of identification information out of the 1st to 5th pieces of identification information is received, the first timer to which the first timer is set may be started for each service.

In other words, in a state in which multiple pieces of SOC-CMCI are received, and multiple PDU sessions using the information included in the pieces of SOC-CMCI are established, in the case that the first message including one or more pieces of identification information out of the 1st to 5th pieces of identification information is received, the UE_A 10 may start the first timer to which the first timer is set for each PDU session. Furthermore, in a state in which multiple pieces of SOC-CMCI are received, and multiple services indicated by the information included in the pieces of SOC-CMCI are performed, in the case that the first message including one or more pieces of identification information out of the 1st to 5th pieces of identification information is received, the UE_A 10 may start the first timer to which the first timer is set for each service.

Conversely, in a state in which the PDU session(s) matching the criteria/criterion included in the SOC-CMCI is not established, in the case that the first message including one or more pieces of identification information out of the 1st to 5th pieces of identification information is received, the UE_A 10 may perform the de-registration procedure. Furthermore, in a state in which the service(s) matching the criteria/criterion included in the SOC-CMCI is not being performed, in the case that the first message including one or more pieces of identification information out of the 1st to 5th pieces of identification information is received, the UE_A 10 may perform the de-registration procedure.

In other words, in a state in which the PDU session(s) is not established using the information included in the SOC-CMCI, in the case that the first message including one or more pieces of identification information out of the 1st to 5th pieces of identification information is received, the UE_A 10 may perform the de-registration procedure. Furthermore, in a state in which the service(s) indicated by the information included in the SOC-CMCI is not performed, in the case that the first message including one or more pieces of identification information out of the 1st to 5th pieces of identification information is received, the UE_A 10 may perform the de-registration procedure.

Note that, in a case that multiple criteria match one PDU session, the UE_A 10 may select the timer value having the largest value out of the timer values associated with the respective criteria.

In a case that the SOR-CMCI stored by the UE_A 10 includes the priority, the UE_A 10 may select the timer value to be set to the first timer, based on the priority.

Furthermore, in the case that the first message including one or more pieces of identification information out of the 1st to 5th pieces of identification information is received, the UE_A 10 may select the timer value to be set to the first timer, or may configure the selected timer value to the first timer, based on the priority.

In a case that the UE_A 10 stores multiple priorities having the same value, the timer value having the largest value out of the timer values having the same priority may be selected.

Furthermore, in a case that the UE_A 10 receives the first message including one or more pieces of identification information out of the 1st to 5th pieces of identification information, and there are multiple priorities indicating the same value, the UE_A 10 may select the largest value out of the timer values associated with the priorities as the first timer value, or may configure the selected timer value to the first timer.

Furthermore, the UE_A 10 may select the first timer value based on the priorities included in the respective criteria and configure the selected first timer value to the first timer, or may start the first timer to which the selected first timer is set.

Specifically, in the case that multiple criteria are included in the SOC-CMCI, and multiple PDU sessions matching the criteria included in the SOC-CMCI are established, the UE_A 10 may select the first timer value based on the priorities included in the respective criteria and configure the selected first timer value to the first timer, or may start the first timer to which the selected first timer is set. Furthermore, also in the case that multiple criteria are included in the SOC-CMCI, and multiple services matching the criteria included in the SOC-CMCI are being performed, the UE_A 10 may select the first timer value based on the priorities included in the respective criteria and configure the selected first timer value to the first timer, or may start the first timer to which the selected first timer is set.

In other words, in the case that multiple criteria are included in the SOC-CMCI, and multiple PDU sessions using the information included in the SOC-CMCI are established, the UE_A 10 may select the first timer value based on the priorities included in the respective criteria and configure the selected first timer value to the first timer, or may start the first timer to which the selected first timer is set. Furthermore, also in the case that multiple criteria are included in the SOC-CMCI, and multiple services indicated by the information included in the SOC-CMCI are performed, the UE_A 10 may select the first timer value based on the priorities included in the respective criteria and configure the selected first timer value to the first timer, or may start the first timer to which the selected first timer is set.

Here, the UE_A 10 may compare the priorities included in the respective criteria, extract a criterion having the highest priority, and select the first timer value associated with the extracted criterion, and thereby implement selection of the first timer value, based on the priorities included in the respective criteria.

Note that, in a case that multiple criteria having the highest priority are extracted as a result of comparison of the priorities included in the respective criteria, the UE_A 10 may select the largest value out of the first timer values associated with the respective extracted criteria as the first timer value. Furthermore, in this case, the UE_A 10 may configure the selected first timer value to the first timer, or may start the first timer to which the selected first timer is set.

Furthermore, the UE_A 10 may select the first timer value based on the priorities included in the respective pieces of SOC-CMCI and configure the selected first timer value to the first timer, or may start the first timer to which the selected first timer is set.

Specifically, in the case that multiple pieces of SOC-CMCI are received, and multiple PDU sessions matching the criteria/criterion included in the pieces of SOC-CMCI are established, the UE_A 10 may select the first timer value based on the priorities included in the respective pieces of SOC-CMCI and configure the selected first timer value to the first timer, or may start the first timer to which the selected first timer is set. Furthermore, also in the case that multiple pieces of SOC-CMCI are received, and multiple services matching the criteria/criterion included in the pieces of SOC-CMCI are being performed, the UE_A 10 may select the first timer value based on the priorities included in the respective pieces of SOC-CMCI and configure the selected first timer value to the first timer, or may start the first timer to which the selected first timer is set.

In other words, in the case that multiple pieces of SOC-CMCI are received, and multiple PDU sessions using the information included in the pieces of SOC-CMCI are established, the UE_A 10 may select the first timer value based on the priorities included in the respective pieces of SOC-CMCI and configure the selected first timer value to the first timer, or may start the first timer to which the selected first timer is set. Furthermore, also in the case that multiple pieces of SOC-CMCI are received, and multiple services indicated by the information included in the pieces of SOC-CMCI are performed, the UE_A 10 may select the first timer value based on the priorities included in the respective pieces of SOC-CMCI and configure the selected first timer value to the first timer, or may start the first timer to which the selected first timer is set.

Here, the UE_A 10 may compare the priorities included in the respective pieces of SOC-CMCI, extract a piece of SOC-CMCI having the highest priority, and select the first timer value included in the extracted piece of SOC-CMCI, and thereby implement selection of the first timer value, based on the priorities included in the respective criteria.

Note that, in a case that multiple pieces of SOC-CMCI having the highest priority are extracted as a result of comparison of the priorities included in the respective pieces of SOC-CMCI, the UE_A 10 may select the largest value out of the first timer values associated with the respective extracted pieces of SOC-CMCI as the first timer value. Furthermore, in this case, the UE_A 10 may configure the selected first timer value to the first timer, or may start the first timer to which the selected first timer is set.

Furthermore, the UE_A 10 may perform the above behavior, based on reception of the first message including one or more pieces of identification information out of the 1st to 5th pieces of identification information.

More specifically, in the case that the first message including one or more pieces of identification information out of the 1st to 5th pieces of identification information is received, the UE_A 10 may select the first timer value based on the priorities included in the respective criteria and configure the selected first timer value to the first timer, or may start the first timer to which the selected first timer is set.

Specifically, in the state in which multiple criteria are included in the SOC-CMCI, and multiple PDU sessions matching the criteria included in the SOC-CMCI are established, in the case that the first message including one or more pieces of identification information out of the 1st to 5th pieces of identification information is received, the UE_A 10 may select the first timer value based on the priorities included in the respective criteria and configure the selected first timer value to the first timer, or may start the first timer to which the selected first timer is set. Furthermore, in the state in which multiple criteria are included in the SOC-CMCI, and multiple services matching the criteria included in the SOC-CMCI are being performed, also in the case that the first message including one or more pieces of identification information out of the 1st to 5th pieces of identification information is received, the UE_A 10 may select the first timer value based on the priorities included in the respective criteria and configure the selected first timer value to the first timer, or may start the first timer to which the selected first timer is set.

In other words, in the state in which multiple criteria are included in the SOC-CMCI, and multiple PDU sessions using the information included in the SOC-CMCI are established, in the case that the first message including one or more pieces of identification information out of the 1st to 5th pieces of identification information is received, the UE_A 10 may select the first timer value based on the priorities included in the respective criteria and configure the selected first timer value to the first timer, or may start the first timer to which the selected first timer is set. Furthermore, in the state in which multiple criteria are included in the SOC-CMCI, and multiple services indicated by the information included in the SOC-CMCI are performed, also in the case that the first message including one or more pieces of identification information out of the 1st to 5th pieces of identification information is received, the UE_A 10 may select the first timer value based on the priorities included in the respective criteria and configure the selected first timer value to the first timer, or may start the first timer to which the selected first timer is set.

Here, the UE_A 10 may compare the priorities included in the respective criteria, extract a criterion having the highest priority, and select the first timer value associated with the extracted criterion, and thereby implement selection of the first timer value, based on the priorities included in the respective criteria.

Note that, in a state in which multiple criteria having the highest priority are extracted as a result of comparison of the priorities included in the respective criteria, in the case that the first message including one or more pieces of identification information out of the 1st to 5th pieces of identification information is received, the UE_A 10 may select the largest value out of the first timer values associated with the respective extracted criteria as the first timer value. Furthermore, in this state, in the case that the first message including one or more pieces of identification information out of the 1st to 5th pieces of identification information is received, the UE_A 10 may configure the selected first timer value to the first timer, or may start the first timer to which the selected first timer is set.

Furthermore, in the case that the first message including one or more pieces of identification information out of the 1st to 5th pieces of identification information is received, the UE_A 10 may select the first timer value based on the priorities included in the respective pieces of SOC-CMCI and configure the selected first timer value to the first timer, or may start the first timer to which the selected first timer is set.

Specifically, in the state in which multiple pieces of SOC-CMCI are received, and multiple PDU sessions matching the criteria/criterion included in the pieces of SOC-CMCI are established, in the case that the first message including one or more pieces of identification information out of the 1st to 5th pieces of identification information is received, the UE_A 10 may select the first timer value based on the priorities included in the respective pieces of SOC-CMCI and configure the selected first timer value to the first timer, or may start the first timer to which the selected first timer is set. Furthermore, in the state in which multiple pieces of SOC-CMCI are received, and multiple services matching the criteria/criterion included in the pieces of SOC-CMCI are being performed, also in the case that the first message including one or more pieces of identification information out of the 1st to 5th pieces of identification information is received, the UE_A 10 may select the first timer value based on the priorities included in the respective pieces of SOC-CMCI and configure the selected first timer value to the first timer, or may start the first timer to which the selected first timer is set.

In other words, in the state in which multiple pieces of SOC-CMCI are received, and multiple PDU sessions using the information included in the pieces of SOC-CMCI are established, in the case that the first message including one or more pieces of identification information out of the 1st to 5th pieces of identification information is received, the UE_A 10 may select the first timer value based on the priorities included in the respective pieces of SOC-CMCI and configure the selected first timer value to the first timer, or may start the first timer to which the selected first timer is set. Furthermore, in the state in which multiple pieces of SOC-CMCI are received, and multiple services indicated by the information included in the pieces of SOC-CMCI are performed, also in the case that the first message including one or more pieces of identification information out of the 1st to 5th pieces of identification information is received, the UE_A 10 may select the first timer value based on the priorities included in the respective pieces of SOC-CMCI and configure the selected first timer value to the first timer, or may start the first timer to which the selected first timer is set.

Here, the UE_A 10 may compare the priorities included in the respective pieces of SOC-CMCI, extract a piece of SOC-CMCI having the highest priority, and select the first timer value included in the extracted piece of SOC-CMCI, and thereby implement selection of the first timer value, based on the priorities included in the respective criteria.

Note that, in a state in which multiple pieces of SOC-CMCI having the highest priority are extracted as a result of comparison of the priorities included in the respective pieces of SOC-CMCI, in the case that the first message including one or more pieces of identification information out of the 1st to 5th pieces of identification information is received, the UE_A 10 may select the largest value out of the first timer values associated with the respective extracted pieces of SOC-CMCI as the first timer value. Furthermore, in this state, in the case that the first message including one or more pieces of identification information out of the 1st to 5th pieces of identification information is received, the UE_A 10 may configure the selected first timer value to the first timer, or may start the first timer to which the selected first timer is set.

In a case that multiple criteria match multiple PDU sessions, the UE_A 10 may select the timer value, based on the priorities associated with the respective criteria. Alternatively, in the case that multiple criteria match multiple PDU sessions, the UE_A 10 may select the timer value having the largest value out of the timer values associated with all of the matching criteria.

Alternatively, in the case that multiple criteria match multiple PDU sessions, the largest timer values associated with the matching criteria for the respective PDU sessions may be selected, and each of them may be started. In other words, the UE_A 10 may simultaneously perform the timers associated with the respective PDU sessions. In other words, in a case that the UE_A 10 has multiple PDU sessions, the UE_A 10 can run and manage multiple first timers.

In a case that the criteria/criterion included in the SOR-CMCI is the criteria/criterion belonging to the PDU session (s), and the UE_A 10 establishes the PDU session(s) using the information included in the criteria/criterion belonging to the PDU session(s), the UE_A 10 may select the timer value associated with the criteria/criterion.

In a case that the SOR-CMCI stored by the UE_A 10 includes S-NSSAI_A, the UE_A 10 checks whether there is a PDU session using S-NSSAI_A among the PDU session(s) being currently established. In a case that the PDU session using S-NSSAI_A is being established, the first timer is set to the timer value associated with S-NSSAI_A.

In other words, in a case that S-NSSAI_A of the established PDU session matches the criteria information, the UE_A 10 may configure the first timer value associated with the criteria information to the first timer value, or may start the first timer.

Here, in a case that the first timer is managed for each PDU session, the selected timer value may be set to the first timer associated with the PDU session using S-NSSAI_A. In a case that the first timer is managed for each access, the selected timer value may be set to the first timer associated with the access type associated with the PDU session using S-NSSAI_A.

In a case that the SOR-CMCI stored by the UE_A 10 includes DNN_A, the UE_A 10 checks whether there is a PDU session using DNN_A among the PDU session(s) being currently established. In a case that the PDU session using DNN_A is being established, the first timer is set to the timer value associated with DNN_A.

In other words, in a case that DNN_A of the established PDU session matches the criteria information, the UE_A 10 may configure the first timer value associated with the criteria information to the first timer value, or may start the first timer.

Here, in a case that the first timer is managed for each PDU session, the selected timer value may be set to the first timer associated with the PDU session using DNN_A. In a case that the first timer is managed for each access, the selected timer value may be set to the first timer associated with the access type associated with the PDU session using DNN_A.

In a case that the SOR-CMCI stored by the UE_A 10 includes 5QI_A, the UE_A 10 checks whether there is a PDU session using 5QI_A among the PDU session(s) being currently established. In a case that the PDU session using 5QI_A is being established, the first timer is set to the timer value associated with 5QI_A.

In other words, in a case that 5QI_A of the established PDU session matches the criteria information, the UE_A 10 may configure the first timer value associated with the criteria information to the first timer value, or may start the first timer.

Here, in a case that the first timer is managed for each PDU session, the selected timer value may be set to the first timer associated with the PDU session using 5QI_A. In a case that the first timer is managed for each access, the selected timer value may be set to the first timer associated with the access type associated with the PDU session using 5QI_A.

In a case that the SOR-CMCI stored by the UE_A 10 includes information indicating the access type (3GPP access or non-3GPP access), the UE_A 10 checks whether there is a PDU session on the access indicated by the access type among the PDU session(s) being currently established. In a case that the PDU session on the access is being established, the first timer is set to the timer value associated with the access.

In other words, in a case that the access type of the established PDU session matches the criteria information, the UE_A 10 may configure the first timer value associated with the criteria information to the first timer value, or may start the first timer.

Here, in the case that the first timer is managed for each PDU session, the selected timer value may be set to the first timer associated with the PDU session on the access. In the case that the first timer is managed for each access, the selected timer value may be set to the first timer associated with the access type included in the SOR-CMCI.

In a case that the SOR-CMCI stored by the UE_A 10 includes information indicating the PDU session type (IPv4, IPv6, Ethernet, Unstructured, or the like), the UE_A 10 checks whether there is a PDU session of the type indicated by the PDU session type among the PDU session(s) being currently established. In a case that the PDU session of the type indicated by the PDU session type is being established, the first timer is set to the timer value associated with the PDU session type.

In other words, in a case that the PDU session type of the established PDU session matches the criteria information, the UE_A 10 may configure the first timer value associated with the criteria information to the first timer value, or may start the first timer.

Here, in the case that the first timer is managed for each PDU session, the selected timer value may be set to the first timer associated with the PDU session of the type indicated by the PDU session type. In the case that the first timer is managed for each access, the selected timer value may be set to the first timer associated with the access type associated with the PDU session of the type indicated by the PDU session type.

In a case that the SOR-CMCI stored by the UE_A 10 includes PDU session ID_A, the UE_A 10 checks whether there is a PDU session identified with PDU session ID_A among the PDU session(s) being currently established. In a case that the PDU session identified with PDU session ID_A is being established, the first timer is set to the timer value associated with PDU session ID_A.

In other words, in a case that PDU session ID_A of the established PDU session matches the criteria information, the UE_A 10 may configure the first timer value associated with the criteria information to the first timer value, or may start the first timer.

Here, in the case that the first timer is managed for each PDU session, the selected timer value may be set to the first timer associated with the PDU session identified with PDU session ID_A. In the case that the first timer is managed for each access, the selected timer value may be set to the first timer associated with the access type associated with the PDU session identified with PDU session ID_A.

In a case that the criteria/criterion belonging to the PDU session(s) included in the SOR-CMCI stored by the UE_A 10 includes multiple pieces of information belonging to the PDU session(s), the UE_A 10 may consider that a combination of these multiple pieces of information is one criterion.

Specifically, in a case that the criteria/criterion belonging to the PDU session(s) included in one piece of SOR-CMCI stored by the UE_A 10 includes S-NSSAI_A and DNN_A, the UE_A 10 checks whether there is a PDU session using S-NSSAI_A and DNN_A among the PDU session(s) being currently established. In a case that the PDU session using S-NSSAI_A and DNN_A is being established, the first timer is set to the timer value associated with the criteria/criterion belonging to the PDU session(s).

Here, in the case that the first timer is managed for each PDU session, the selected timer value may be set to the first timer associated with the PDU session using S-NSSAI_A and DNN_A. In the case that the first timer is managed for each access, the selected timer value may be set to the first timer associated with the access type associated with the PDU session using S-NSSAI A and DNN_A.

Also in a case that the criteria/criterion belonging to the PDU session(s) included in the SOR-CMCI includes a combination of multiple pieces of information belonging to other PDU sessions, similarly, the UE_A 10 may check whether PDU session(s) matching the combination of multiple pieces of information belonging to the PDU session(s) is established, and in a case that corresponding PDU session (s) is established, the UE_A 10 may set the timer value associated with the criteria/criterion belonging to the PDU session(s) to the first timer.

In a case that new SOR-CMCI is received while the first timer is running, and the timer value included in the new SOR-CMCI is larger than the timer value set to the first timer value, the UE_A 10 may stop the running first timer value, set the timer value included in the new SOR-CMCI to the first timer value, and newly start the first timer.

In contrast, in a case that new SOR-CMCI is received while the first timer is running, and the timer value included in the new SOR-CMCI is smaller than the timer value set to the first timer value, the UE_A 10 does not stop the running first timer value, does not set the timer value included in the new SOR-CMCI to the first timer value, and does not newly start the first timer.

Specific examples are as follows. In a case that new SOR-CMCI is received while the first timer is running, the UE_A 10 checks whether PDU session(s) matching the criteria/criterion included in the new SOR-CMCI is being established or service(s) matching the service type criteria/criterion included in the new SOR-CMCI is being performed.

In a case that the PDU session(s) matching the criteria/criterion included in the new SOR-CMCI is being established or the service(s) matching the service type criteria/criterion included in the new SOR-CMCI is being performed, the timer value associated with the criteria/criterion and the timer value set to the currently running first timer are compared, and in a case that the above-described timer value associated with the criteria/criterion included in the new SOR-CMCI is larger, the UE_A 10 may stop the running first timer value, set the newly selected timer value to the first timer value, and newly start the first timer. In a case that the above-described timer value associated with the criteria/criterion included in the new SOR-CMCI is smaller, the UE_A 10 need not stop the running first timer value, set the selected new timer value to the first timer, and start it.

Alternatively, in the case that the PDU session(s) matching the criteria/criterion included in the new SOR-CMCI is being established or the service(s) matching the service type criteria/criterion included in the new SOR-CMCI is being performed, the timer value associated with the criteria/criterion and the value of the currently running first timer are compared, and in a case that the above-described timer value associated with the criteria/criterion included in the new SOR-CMCI is smaller, the UE_A 10 need not stop the running first timer value, set the selected new timer value to the first timer, and start it.

In a case that new SOR-CMCI is received while the first timer is running, and the priority included in the new SOR-CMCI is larger than the priority of the timer value set to the running first timer value or the priority associated with the criteria/criterion together with the timer value set to the running first timer value, the UE_A 10 may stop the running first timer value, set the timer value included in the new SOR-CMCI to the first timer value, and newly start the first timer.

In contrast, in a case that new SOR-CMCI is received while the first timer is running, and the priority included in the new SOR-CMCI is smaller than the priority of the timer value set to the running first timer value or the priority associated with the criteria/criterion together with the timer value set to the running first timer value, the UE_A 10 does not stop the running first timer value, does not set the timer value included in the new SOR-CMCI to the first timer value, and does not newly start the first timer.

Specific examples are as follows. In a case that new SOR-CMCI is received while the first timer is running, the UE_A 10 checks whether PDU session(s) matching the criteria/criterion included in the new SOR-CMCI is being established or service(s) matching the service type criteria/criterion included in the new SOR-CMCI is being performed.

In a case that the PDU session(s) matching the criteria/criterion included in the new SOR-CMCI is being established or the service(s) matching the service type criteria/criterion included in the new SOR-CMCI is being performed, the priority associated with the criteria/criterion and the priority of the timer value set to the currently running first timer or the priority associated with the criteria/criterion together with the timer value set to the running first timer value are compared, and in a case that the above-described priority associated with the criteria/criterion included in the new SOR-CMCI is higher (in a case of being prioritized), the UE_A 10 may stop the running first timer value, set the newly selected timer value to the first timer value, and newly start the first timer. In a case that the above-described priority associated with the criteria/criterion included in the new SOR-CMCI is smaller (in a case of not being prioritized), the UE_A 10 need not stop the running first timer value, set the selected new timer value to the first timer, and start it.

Alternatively, in the case that the PDU session(s) matching the criteria/criterion included in the new SOR-CMCI is being established or the service(s) matching the service type criteria/criterion included in the new SOR-CMCI is being performed, the timer value associated with the criteria/criterion and the value of the currently running first timer are compared, and in a case that the above-described timer value associated with the criteria/criterion included in the new SOR-CMCI is smaller, the UE_A 10 need not stop the running first timer value, set the selected new timer value to the first timer, and start it.

In a case that the mode of the UE in selection of the PLMN is switched from the automatic network selection mode to the manual network selection mode while the first timer is running, the UE_A 10 may stop the running first timer and/or stop timing control of transition to the idle mode by the NW.

In that case, the UE_A 10 may notify the core network and/or the core network apparatus such as the AMF of a control message for giving notification of a fact that the mode of the UE in selection of the PLMN has been switched from the automatic network selection mode to the manual network selection mode, and/or a fact that the UE_A 10 has stopped the running first timer, and/or a fact that the UE_A 10 has stopped timing control of transition to the idle mode by the NW.

While the first timer is running, the UE_A 10 may be controlled not to be able to transmit the PDU session establishment request message for establishing PDU session(s) other than an emergency PDU session to the same S-NSSAI and/or the same DNN and/or the same PLMN corresponding to the PDU session(s) established by the UE_A 10, until the first timer expires or until the first timer is stopped.

In other words, while the first timer is running, the UE_A 10 may be able to transmit the PDU session establishment request message to S-NSSAI other than the same S-NSSAI and/or a DNN other than the same DNN and/or a PLMN other than the same PLMN corresponding to the PDU session(s) established by the UE_A 10, and may be controlled to be able to transmit the PDU session establishment request message for establishing an emergency PDU session regardless of a requested S-NSSAI, DNN, and PLMN, until the first timer expires or until the first timer is stopped.

In yet other words, the UE_A 10 may be prohibited from transmitting the PDU session establishment request message using information the same as the information included in the criteria information associated with the first timer, until the first timer expires or until the first timer is stopped. Furthermore, the UE_A 10 may be configured to be prohibited from transmitting PDU session establishment request message using information the same as the information included in the criteria information associated with the first timer, until the first timer expires or until the first timer is stopped.

Furthermore, the UE_A 10 may be prohibited from initiating the PDU session establishment procedure using information the same as the information included in the criteria information associated with the first timer, until the first timer expires or until the first timer is stopped. Furthermore, the UE_A 10 may be configured to be prohibited from initiating the PDU session establishment procedure using information the same as the information included in the criteria information associated with the first timer, until the first timer expires or until the first timer is stopped.

Here, the information included in the criteria information associated with the first timer may be one or more pieces of information out of S-NSSAI_A, DNN_A, 5QI_A, the access type, the PDU session type, and PDU session ID_A.

Furthermore, the UE_A 10 may be allowed to transmit only the PDU session establishment request message using information indicating an emergency PDU session, until the first timer expires or until the first timer is stopped. Furthermore, the UE_A 10 may be configured to be allowed to transmit only the PDU session establishment request message using information indicating an emergency PDU session, until the first timer expires or until the first timer is stopped.

Furthermore, the UE_A 10 may be allowed to initiate only the PDU session establishment procedure for establishing an emergency PDU session, until the first timer expires or until the first timer is stopped. Furthermore, the UE_A 10 may be configured to be allowed to initiate only the PDU session establishment procedure for establishing an emergency PDU session, until the first timer expires or until the first timer is stopped.

While the first timer is running, the UE_A 10 may be controlled not to be able to start establishment of PDU session(s) for establishment of PDU session(s) using the respective criteria included in the SOR-CMCI stored by the UE_A 10, other than that for an emergency PDU session, until the first timer expires or until the first timer is stopped.

Alternatively, while the first timer is running, the UE_A 10 may not be controlled regarding the procedure for PDU session establishment, and may be allowed to transmit all of the PDU session establishment request messages for PDU session establishment.

In other words, the UE_A 10 may be allowed to transmit the PDU session establishment request message using information the same as the information included in the criteria information associated with the first timer, even until the first timer expires or until the first timer is stopped. Furthermore, the UE_A 10 may be configured to be allowed to transmit the PDU session establishment request message using information the same as the information included in the criteria information associated with the first timer, even until the first timer expires or until the first timer is stopped.

Furthermore, the UE_A 10 may be allowed to initiate the PDU session establishment procedure using information the same as the information included in the criteria information associated with the first timer, even until the first timer expires or until the first timer is stopped. Furthermore, the UE_A 10 may be configured to be allowed to initiate the PDU session establishment procedure using information the same as the information included in the criteria information associated with the first timer, even until the first timer expires or until the first timer is stopped.

While the first timer is running, the UE_A 10 may be caused to stop running the first timer, based on release of the PDU session(s) associated with the first timer or stop of the service(s) associated with the first timer.

While the first timer is running, the NW may initiate a procedure for release of the PDU session(s) associated with the first timer, and thereby immediately stop the first timer, and for SOR, the UE_A 10 may release all of the established PDU sessions and indicate transition to the idle mode.

The UE_A 10 performs the de-registration procedure, releases all of the established PDU sessions, and transitions to the idle mode, based on expiration or stop of the first timer. The expiration of the first timer means that the value of the first timer has reached 0, and in a case that the timer value of 0 is set to the first timer, this may be processed as a case that the first timer has expired.

More specifically, the UE_A 10 may perform the de-registration procedure, release all of the established PDU sessions, and transition to the idle mode, based on expiration or stop of all of the first timers. Note that, even in a case that the first timer expires or stops, in a case that another first timer is running, the UE_A 10 need not perform release of the PDU session(s) and transition to the idle mode.

In a case that the first timer is stopped based on reception of the new SOR-CMCI and the first timer is stopped based on change of the mode of the UE in selection of the PLMN, transition of the idle mode based on performing of the de-registration procedure need not be requested.

Even in a case that the first timer expires or stops in case that the UE_A 10 has established an emergency PDU session, transition of the idle mode based on performing of the de-registration procedure need not be requested.

Note that, in a case that the UE_A 10 runs multiple first timers, and all of the first timers expire and/or stop, the UE_A 10 may release all of the established PDU sessions, and transition to the idle mode.

Regarding the UE_A 10, for SOR, the UE_A 10 may release all of the established PDU sessions, and transition to the idle mode. The UE that has transitioned to the idle mode may select a PLMN having high priority, and attempt to acquire service(s) for the selected PLMN. In selection of the PLMN, information included in the SOR information notified from the NW may be used.

4. Modifications

A program running on an apparatus according to the present invention may serve as a program that controls a Central Processing Unit (CPU) and the like to cause a computer to operate in such a manner as to realize the functions of the aforementioned embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. The "computer-readable recording medium" may be a semiconductor recording medium, an optical recording medium, a magnetic recording medium, a medium dynamically retaining the program for a short time, or any other computer-readable recording medium.

Each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that, with advances in semiconductor technology, a circuit integration technology that replaces the present integrated circuits appears, one or more aspects of the present invention can also use a new integrated circuit based on the technology.

Note that, the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. A configuration in which elements described in the respective embodiments and having mutually the similar effects, are substituted for one another is also included.

CROSS-REFERENCE TO RELATED APPLICATION

The present application claims priority of JP 2021-066222, filed on Apr. 9, 2021, and all the contents thereof are included herein by the reference.

REFERENCE SIGNS LIST

1 Mobile communication system
10 UE_A
30 PGW-U
32 PGW-C
35 SGW
40 MME
45 eNB
50 HSS
60 PCRF

80 Access network_A (E-UTRAN)
90 Core network_A
120 Access network_B (5G AN)
122 gNB
130 UPF
132 SMF
140 AMF
150 UDM
160 PCF
190 Core network_B

The invention claimed is:

1. A User Equipment (UE), comprising:

transmission and reception circuitry configured to receive steering of roaming (SOR)-connected mode control information (SOR-CMCI) from a control apparatus; and controller circuitry configured to:

update a user controlled list of services exempted from release due to SOR in the UE, upon the update of the user controlled list of services exempted from release due to SOR and while one or more Tsor-cm timers are running, check whether an ongoing service is included in the updated user controlled list of services exempted from release due to SOR, upon a determination that the ongoing service is not included in the updated user controlled list of services exempted from release due to SOR, and that a current value of a Tsor-cm timer of the one or more Tsor-cm timers corresponding to the ongoing service is set to infinity, check whether a matching criterion is included in the SOR-CMCI, and upon a determination that the matching criterion for the ongoing service is not included in the SOR-CMCI, set a value of the Tsor-cm timer corresponding to the ongoing service to 0.

2. The UE according to claim 1, wherein the controller circuitry is further configured to, upon a determination that the matching criterion for the ongoing service is included in the SOR-CMCI, that a value of the Tsor-cm timer included in the SOR-CMCI is not infinity, and that the value of the Tsor-cm timer does not exceed values of all of the one or more Tsor-cm timers that are running, replace the value of the Tsor-cm timer corresponding to the ongoing service with the value of the Tsor-cm timer included in the SOR-CMCI.

3. A communication control method performed by a User Equipment (UE), the communication control method comprising:

receiving steering of roaming (SOR)-connected mode control information (SOR-CMCI) from a control apparatus;

updating a user controlled list of services exempted from release due to SOR in the UE, upon the update of the user controlled list of services exempted from release due to SOR and while one or more Tsor-cm timers are running, checking, by the UE, whether an ongoing service is included in the updated user controlled list of services exempted from release due to SOR;

upon a determination that the ongoing service is not included in the updated user controlled list of services exempted from release due to SOR, and that a current value of a Tsor-cm timer of the one or more Tsor-cm timers corresponding to the ongoing service is set to infinity, checking, by the UE, whether a matching criterion is included in the SOR-CMCI; and upon a determination that the matching criterion for the ongoing service is not included in the SOR-CMCI, setting, by the UE, a value of the Tsor-cm timer corresponding to the ongoing service to 0.

* * * * *